US009705895B1

(12) United States Patent
Gutzmann

(10) Patent No.: US 9,705,895 B1
(45) Date of Patent: Jul. 11, 2017

(54) SYSTEM AND METHODS FOR CLASSIFYING INTERNET DEVICES AS HOSTILE OR BENIGN

(71) Applicant: DCS7, LLC, Nashville, TN (US)

(72) Inventor: Kurt M. Gutzmann, Leesburg, VA (US)

(73) Assignee: DCS7, LLC, Nashville, TN (US)

( * ) Notice: Subject to any disclaimer, the term of this patent is extended or adjusted under 35 U.S.C. 154(b) by 0 days.

(21) Appl. No.: 14/323,826

(22) Filed: Jul. 3, 2014

Related U.S. Application Data

(60) Provisional application No. 61/957,497, filed on Jul. 5, 2013.

(51) Int. Cl.
*H04L 29/06* (2006.01)
*H04L 9/32* (2006.01)
*G06F 21/46* (2013.01)

(52) U.S. Cl.
CPC ............ *H04L 63/14* (2013.01); *G06F 21/46* (2013.01); *H04L 9/3271* (2013.01); *H04L 9/3273* (2013.01)

(58) Field of Classification Search
CPC ..... H04L 63/08; H04L 63/0876; H04L 63/14; H04L 9/3271; H04L 9/3273; G06F 21/36; G06F 21/46
See application file for complete search history.

(56) References Cited

U.S. PATENT DOCUMENTS

| | | |
|---|---|---|
| 6,088,804 A | 7/2000 | Hill et al. |
| 6,738,814 B1 | 5/2004 | Cox et al. |
| 6,789,203 B1 | 9/2004 | Belissent |
| 6,944,663 B2 | 9/2005 | Schuba et al. |

(Continued)

OTHER PUBLICATIONS

H. Beitollahi et al., "Tackling Application-layer DDoS Attacks", Procedia Computer Science; SciVerse ScienceDirect, dated 2012.

(Continued)

*Primary Examiner* — John B King
*Assistant Examiner* — Arya Golriz
(74) *Attorney, Agent, or Firm* — Bass, Berry & Sims, PLC; Terry L. Clark

(57) ABSTRACT

Systems and methods for classification of internet devices for classifying devices on the Internet as either hostile or benign. Hostile devices are those that are or will be engaging in denial of service attacks. The systems and methods for classification of internet devices as hostile or benign generally include 1) a proof-of-work protocol, 2) a method for adjusting a device's 'attacker score' based on its protocol behavior, 3) a method for detecting tampering of puzzle parameters, 4) a method for limiting request rates of both benign and hostile devices, 5) a method for collecting device fingerprints and their associated status from a high-speed memory cache and persisting them to a database, 6) a web services deployment model to provide device classification services to third parties, and 7) a method for dissemination of device blacklists and whitelists to all subscribers of the web service 8) a deployment model of the attacker identification system as a request filter at the front-end of a distributed web services system, and 9) a management server for control of the system parameters to enable various modes of classification and device request rate limiting.

61 Claims, 14 Drawing Sheets

(56) References Cited

U.S. PATENT DOCUMENTS

| | | | |
|---|---|---|---|
| 7,600,255 | B1 | 10/2009 | Baugher |
| 7,853,533 | B2 | 12/2010 | Eisen |
| 8,112,483 | B1 | 2/2012 | Emigh et al. |
| 8,151,327 | B2 | 4/2012 | Eisen |
| 8,321,955 | B2 | 11/2012 | Feng et al. |
| 8,374,983 | B1* | 2/2013 | Pohl .................. G06F 17/30873 706/46 |
| 2002/0163926 | A1* | 11/2002 | Moharram .......... H04L 63/1408 370/428 |
| 2003/0093509 | A1 | 5/2003 | Li et al. |
| 2009/0113559 | A1* | 4/2009 | Schneider ............... H04L 63/08 726/29 |
| 2009/0192853 | A1* | 7/2009 | Drake .................... G06Q 10/06 705/319 |
| 2010/0031315 | A1 | 2/2010 | Feng et al. |
| 2010/0131709 | A1* | 5/2010 | Yoshida .............. G06F 11/2221 711/115 |
| 2010/0180333 | A1 | 7/2010 | Bono et al. |
| 2011/0218860 | A1* | 9/2011 | Barber ................... G06Q 10/00 705/14.53 |
| 2011/0231913 | A1 | 9/2011 | Feng et al. |
| 2012/0189194 | A1* | 7/2012 | Srivastava ............ G06F 21/316 382/161 |
| 2012/0323700 | A1* | 12/2012 | Aleksandrovich ..... G06Q 30/00 705/14.69 |
| 2013/0055374 | A1 | 2/2013 | Kustarz et al. |
| 2013/0312097 | A1* | 11/2013 | Turnbull ................. G06F 21/55 726/24 |

OTHER PUBLICATIONS

H. Beitollahi et al., "Analyzing well-known countermeasures against distributed denial of service attacks", Computer Communications, dated 2012.
Y. Chen et al., "A Novel DDoS Attack Defending Framework with Minimized Bilateral Damages", Dept. of Electrical & Computer Engineering, SUNY—Binghamton, Binghampton NY 13902; Dept. of Computer Science & Software Engineering, Auburn University, Auburn, AL 36849, dated 2010.
P. Djalaliev, "Mitigating Botnet-Based DDoS Attacks Against Web Servers", Submitted to the Graduate Faculty of the Dietrich School of Arts and Sciences—University of Pittsburgh, dated 2013.
E. Kaiser, "Addressing Automated Adversaries of Network Applications", Submitted to the Dissertation Committee—Portland State University, dated 2010.
S. Khor, et al. "DaaS: DDoS Mitigation as-a-service", IEEE/IPSJ International Symposium on Applications and the Internet, dated 2011.
P. Vu, "Defending Against Distributed Denial of Service Attacks Using a Cloud Based Architecture", Thesis—The University of Houston, Clear Lake, Dated Dec. 2012.
B. Waters et al., "New Client Puzzle Outsourcing Techniques for DoS Resistance", Princeton University, Princeton, NJ; RSA Laboratories, Bedford, MA, Oct. 25-29, 2004.
S. Zargar et al., "A Survey of Defense Mechanisms Against Distributed Denial of Service (DDoS) Flooding Attacks", IEEE, 2013.
Buscher, "Tracking DDoS Attacks: Insights into the business of disrupting the Web", NATO Cyber Defense Center of Excellence CYCON dated Jun. 2012.
International Telecommunications Union (ITU), IT RecommendationX.200, "Data Networks and Open System Communications—Open Systems Interconnection-Model and Notation, Basic Reference Model," Jul. 1994.
Internet Engineering Task Force (IETF), Request for Comments 2616, "Hypertext Transfer Protocol-HTTP/1.1", Jun. 1999.
J. Mirkovic, et al., Internet Denial of Service: Attack and defense Mechanisms, Prentice-Hall, 2008.
J. Crowcroft et al., "Lazy Zusan: Dumb waiting as proof of work," University of Cambridge Technical Report No. 703, Nov. 2007.
J. Rangasamy, et al. "An integrate approach to cryptographic mitigation of denial-of-service attacks", Proceedings of the 6th ACM Symposium on Information, Computer and Communications Security (ASIACCS) 2011.
Kurt Gutzmann, "Role-Based Access Control in HTTP Environment", IEEE Journal of Internet Computing, Jan. 2001.
M. Abliz et al., "A Guided Tour Puzzle for Denial of Service Prevention", Proceedings of the Annual Computer Security Applications Conference, 2009.
P. Mittal et al., "Towards Deployable DDoS Defense for Web Application", Arxiv preprint arXiv:1110-1060, Oct. 5, 2011.
V. Laurens et al., "Requirements for Client Puzzles to Defeat the Denial of Service and Distributed Denial of Service Attacks", The International Arab Journal of Information Technology, vol. 3, No. 4, Oct. 2006.
Y. Xie et al., "Monitoring the Application-Layer DDos Attacks for Popular Websites," IEEE/ACM Transactions Networking, vol. 17, No. 1, Feb. 2009.

* cited by examiner

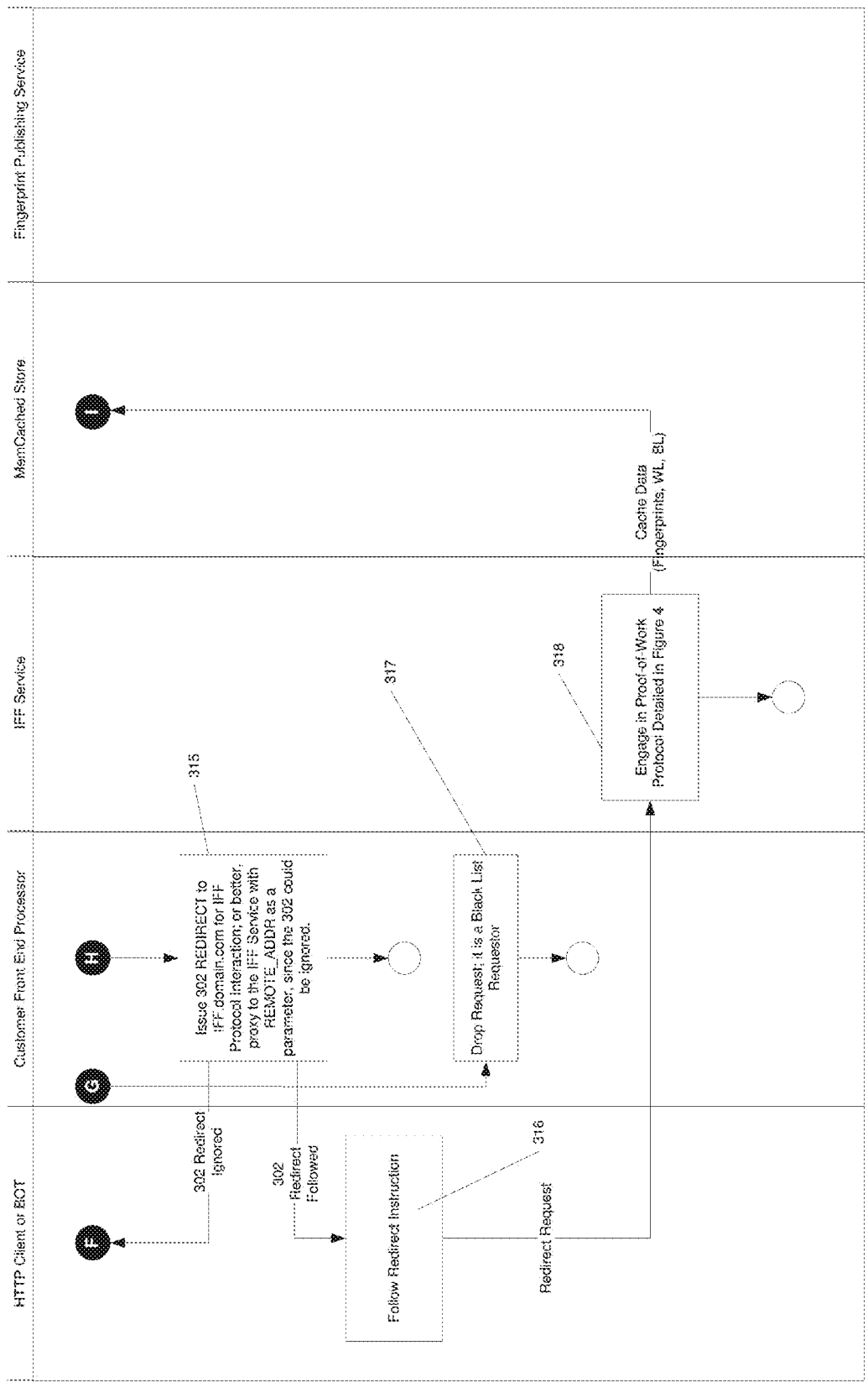

US 9,705,895 B1

SYSTEM AND METHODS FOR CLASSIFYING INTERNET DEVICES AS HOSTILE OR BENIGN

This Application claims priority to U.S. Provisional Application No. 61/957,497, filed Jul. 5, 2013, the disclosures of which are incorporated herein in their entirety by reference.

BACKGROUND

The present disclosure relates generally to the classification or identification of internet devices as "hostile" or "benign" devices. Devices include but are not limited to general computers executing software (such as a web browser) engaging as clients in the hypertext transfer protocol (HTTP) with one or more servers (web servers). Hostile devices are those that are or will be engaging in denial of service attacks. Denial of service attacks attempt to disrupt, destroy, or degrade the services provided by a web server by overwhelming it with a very large rate of requests. The present disclosure provides systems and methods for classifying devices as hostile (attackers) or not, thereby permitting the mitigation of denial of service attacks by device-based filtering of requests.

We will elaborate further on the background of denial of service (DoS) attacks on the public Internet here. The communications protocols controlling the operation of the Internet are known as the "Internet Protocol" (IP) suite, and commonly assigned a system of "layers" numbered from one through seven (1-7) according to the International Telecommunications Union (ITU) (1994). Briefly, the seven layers are 1) Physical 2) Data Link 3) Network 4) Transport 5) Session 6) Presentation and 7) Application. Even though the IP protocol suite does not explicitly call out the 7-layer OSI (Open Systems Interconnection) model, the OSI model is used when discussing IP protocols nonetheless in common practices. Here, the attention is on "Layer 7" or the "Application Layer." The hypertext transfer protocol (Internet Engineering Task Force (IETF), 1999) is an application layer or layer-7 protocol that itself is comprised of other lower-level protocols, specifically the Transmission-Control-Protocol/Internet-Protocol (TCP/IP). The present disclosure is directed towards managing and mitigating DoS attacks using the HTTP protocol (or its encrypted transport version, HTTPS). In subsequent discussion of the background, "DoS attack" will mean generally attacks using the HTTP protocol.

The objective of a DoS attack is to deny a web site or service to its legitimate users by making it unavailable through an excessive volume or rate of HTTP requests. This is known as a flooding attack or a basic volumetric attack. These attacks seek to exhaust resources of the target such as network bandwidth, processor capacity, memory, connection pools, and so on. Attacks may be more subtle as well, exploiting a semantic or computational vulnerability of the target. For example, DoS attacks on a web site's "search" function are semantic in nature, since the attacker infers that some back-end database will be involved in processing the search query and may be overloaded more easily.

The attacker accomplishes the DoS attack by using a collection of computers known as "bots" or "zombies" (Mirkovic, 2008). These are computers that have been exploited through various viruses, malwares, or security vulnerabilities such that they can be remotely controlled by the attacker to carry out commands. These computers are referred to in the descriptions herein as 'hostile devices.' The bots altogether are known as a "botnet." Botnets range in size from a few thousand computers to a million or more (Buscher, 2012). This provides the attacker with a significant computing power advantage over his target, where he is able to bring to bear a large and potentially debilitating number of requests against the targeted web servers or front-end devices (this is an asymmetric cyberwarfare method). Significantly, the actual software executing on a bot that is part of a DoS attack must be an HTTP client. However, unlike the typical web browsers used by people (Internet Explorer, FireFox, Chrome, Safari, Opera, et cetera), these bot web clients will generally (but not always) not execute any client-side scripting languages, including but not limited to ECMAScript, JavaScript, Jscript, and so on. The reason for this is that the bot has no interest in the user-experience features these languages provide, and executing them will only delay the bot from sending its next request in the flood. However, bots are often capable of accepting and returning information tokens such as, without limitation, cookies (IETF, 1999) or Uniform Resource Locator (URL) query parameters.

Client puzzles or proofs-of-work have been used as part of many systems and protocols for addressing DoS attacks. CAPTCHAs (Completely Automated Public Turing test to tell Computers and Humans Apart), usually a visual puzzle, are a type of client puzzle that is not precisely a proof of work; rather, a successful answer to a CAPTCHA classifies the responder as a human. However, many CAPTCHA schemes are considered 'broken' through the use of adversarial optical character recognition (A-OCR) techniques (e.g., Pretend We're Not a Turing Computer but a Human Antagonist(PWNTCHA)), http://caca.zoy.org/wiki/PWNtcha).

Mathematical proofs-of-work are generally considered more robust, and their functional requirements have been well-documented (Laurens, 2006). In general, a mathematical proof-of-work must satisfy the following requirements: 1) have a solution 2) server computational costs for puzzle generation and verification must be orders of magnitude smaller than client computational costs required to find a solution 3) puzzles must be solved in a limited amount of time 4) pre-computation of solutions in advance should be infeasible 5) previous solutions do not assist in finding future solutions 6) the puzzle-issuance and puzzle-verification process should not require any persistence of the connection state between the server and client. The present systems and methods satisfy these requirements. In addition to these requirements identified by (Laurens, 2006), puzzles (challenges), their solutions, and related parameters (expirations times, internet domain of applicability) must all be either tamper-proof or at least tamper-evident (Gutzmann, 2001). This requirement prevents clients from substituting easy puzzles for hard ones, for example. The present systems and methods satisfy this requirement through the use of message authentication codes (MAC).

A final requirement for layer-7 systems is that they must operate in a manner that does not affect the content delivery and rendering at the client web browser. In Feng's approach (Feng, U.S. Pat. No. 8,321,955), URLs are rewritten dynamically by a client-side JavaScript component and additional JavaScript is injected to the pages; thus, what is finally rendered at the client web browser is not what would be sent by a server in the absence of the proof-of-work protocol element. With the pervasive, complex, and unavoidable use of JavaScript today, Feng's approach potentially disrupts the proper rendering of the content due various reasons such as namespace collisions, function overloads, and modification of execution sequences of scripts. The present systems and methods use a short-duration ticketing approach that permits unmodified delivery of server content to the browser, thereby avoiding that problem.

While there are many possible proof-of-work systems, most commonly used are what are known as "hash pre-image" puzzles. In this type of puzzle, a client must find a concatenation of a server challenge and client 'solution' such that that pre-image (input string) to a one-way function (including but not limited to a 'hash' function, such as Message-Digest-5 (MD5), Secure Hash Algorithm (SHA), Secure Hash Algorithm 256 (SHA256), etc) that produces a server-specified number of leading zero bits in the output. The number of leading bits is typically called the puzzle difficulty. More difficult puzzles require larger computational costs and time on the client side; adjustments of the difficulty level have the effect of 'throttling' the client since it cannot make HTTP requests while involved in finding a solution. Variations on the basic hash pre-image puzzle exist. Some require that the leading bits evaluate to a number less/greater than some specified value (Rangasamy, 2011).

Much work has been done on DoS attacks at the lower layers of the communication model (e.g., Hill, U.S. Pat. No. 6,088,804; Cox, U.S. Pat. No. 6,738,814) since layer 3-4 attacks (e.g., the Transmission Control Protocol—Synchronize "TCP SYN" attack) form a large part of the DoS attacker's arsenal. At the application layer, Feng and Kaiser (Feng et al. U.S. Pat. No. 8,321,955) developed a DoS mitigation approach using a proof-of-work client puzzle for both layer 3-4, and for layer 7. Much of the disclosure in Feng's patent (U.S. Pat. No. 8,321,955) is focused on the lower network layers, but a final section discusses a client puzzle (a.k.a. proof-of-work) for an HTTP server. In Feng's system and method, the claims are made for prioritizing traffic based on its past history of traffic rate or volume. All traffic is accepted in that system, but is directed to a high or low priority service running in a single computer. In the details of the embodiment of Feng's disclosure a probabilistic data structure ("Bloom Filter") is used to tally historical request counters on a per Internet Protocol address (IP address) basis. One of several drawbacks of Feng's system is that it works on a single computer only due to the local data structure, the Bloom filter, used to determine puzzle difficulty based on request history. In practice, almost all large and commercially significant web sites are complex distributed systems (similar to elements 101-103 in FIG. 1). The need for distributed shared memory arises then, and this is addressed by the present disclosure. Feng's use of IP address alone also presents practical problems; for example, many internet service providers (e.g., Verizon, America Online) operate caching proxy servers as intermediaries between HTTP clients and servers. From the web server's point of view, then, there is a single IP address (that of the proxy) behind which there may be many thousands of distinct HTTP clients ("devices" as we call them here). Using Feng's request-counting approach, the proxy IP will be incorrectly de-prioritized thus delivering a poor user experience to all clients behind the proxy. That drawback is addressed by the current disclosure's use of device fingerprinting methods which differentiate many devices sharing the same IP address (this also is applied to the classification of bots that are polymorphic in their device fingerprint).

BRIEF SUMMARY OF AN EXEMPLARY EMBODIMENT

The disclosure generally relates to Internet attacker identification systems and methods which include 1) a proof-of-work puzzle protocol, 2) a method for adjusting a device's "attacker score" based on its protocol behavior, 3) a method for detecting tampering of proof-of-work puzzle parameters, 4) a method for limiting request rates of both benign and hostile devices, 5) a method for collecting device fingerprints and IP addresses and their associated status from a high-speed memory cache and persisting them to a database, 6) a web services deployment model to provide device classification services to third parties, and 7) a method for dissemination of device blacklists and whitelists to all subscribers of the web service, 8) a deployment model of the attacker identification system as a request filter at the front-end of a distributed web services system, and 9) a management server for control of the system parameters to enable various modes of classification and device request rate limiting.

There has thus been outlined, rather broadly, some of the features of the systems and methods in order that the detailed description thereof may be better understood, and in order that the present contribution to the art may be better appreciated. There are additional features of the systems and methods that will be described hereinafter.

In this respect, before explaining at least one embodiment of the systems and methods in detail, it is to be understood that the disclosure is not limited in its application to the details of construction or to the arrangements of the components set forth in the following description or illustrated in the drawings. The systems and methods are capable of other embodiments and of being practiced and carried out in various ways. Also, it is to be understood that the phraseology and terminology employed herein are for the purpose of the description and should not be regarded as limiting.

An object is to provide systems and methods for classification of internet devices as hostile or benign. Hostile devices are those that are or will be engaging in denial of service attacks, while benign devices are not or will not be engaging in denial of service attacks.

Another object is to provide Systems and Methods for Classification of Internet Devices that produces a device fingerprint of hostile devices. A device fingerprint is an identifier of an HTTP client computer and software that is almost surely unique.

Another object is to provide Systems and Methods for Classification of Internet Devices that produces a device fingerprint of benign devices.

Another object is to provide Systems and Methods for Classification of Internet Devices that produces an "attack score" indicating the relative degree of maliciousness of a device identified by its device fingerprint.

Another object is to provide Systems and Methods for Classification of Internet Devices that provides a proof-of-work system that results in limitation of the request rate of hostile devices when those devices will execute JavaScript programs supplied to them.

Another object is to provide Systems and Methods for Classification of Internet Devices that provides a method of adjusting the difficulty of the proof-of-work puzzle based on the attacker score of a device.

Another object is to provide Systems and Methods for Classification of Internet Devices that provides a method for placing a hostile device on a "black list" once its attacker score crosses an upper threshold.

Another object is to provide Systems and Methods for Classification of Internet Devices that provides a method for placing a benign device on a "white list" once its attacker score crosses a lower threshold.

Another object is to provide Systems and Methods for Classification of Internet Devices that provides a method for accumulating and distributing white lists and black lists of devices to subscribers of an embodiment of the systems and methods implemented as an Internet web service.

Another object is to provide Systems and Methods for Classification of Internet Devices that provides a method for detection of tampering of the challenges in a proof-of-work puzzle.

Another object is to provide Systems and Methods for Classification of Internet Devices that provides a method for detection of replay of solutions to a proof-of-work puzzle.

Another object is to provide Systems and Methods for Classification of Internet Devices that provides a method for deploying a web service as an embodiment of the systems and methods such that subscribers of the service may refer requesting devices from their web sites to the web service for classification.

Another object is to provide Systems and Methods for Classification of Internet Devices that provides a method for deploying the classification system as front-end request filter of a web server or collection of web servers.

Another object is to provide Systems and Methods for Classification of Internet Devices that provides a method for setting, retrieving, modifying, and inspecting the parameters of the proof-of-work protocol so as to enable various operational modes of the classification system.

Another object is to provide Systems and Methods for Classification of Internet Devices that provides a method for classifying as hostile devices that display polymorphism in their device fingerprints.

Other objects and advantages of the present systems and methods will become obvious to the reader and it is intended that these objects and advantages are within the scope of the present disclosure. To the accomplishment of the above and related objects, these systems and methods may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present systems and methods will become fully appreciated as the same becomes better understood when considered in conjunction with the accompanying drawings, in which like reference characters designate the same or similar parts throughout the several views, and wherein:

FIG. 1 is a system architecture diagram for deployment of the systems and methods in a highly scalable manner to support device fingerprinting, classification, and white/black list distribution. This system architecture describes an embodiment of the systems and methods as a web service for numerous subscribers;

FIG. 2 is a system architecture diagram for deployment of the systems and methods in a highly scalable manner to support device fingerprinting, classification, and white/black list filtering at a system's front end. This architecture describes an embodiment of the systems and methods as a stand-alone system for classifying devices making requests of a single web service;

FIG. 3C is a flowchart (an "activity diagram" which is a multiple side-by-side flowchart divided into lanes illustrating both control flow in a lane and data flows between the entities performing the actions in each lane) showing the operation of the proof-of-work protocol of the present systems and methods when deployed as web service for multiple subscribers (this corresponds to the architecture diagram in FIG. 1);

FIG. 5 is a state transition model for devices;

FIG. 6 is a state transition for servers implementing the classification method;

FIG. 7 is a state transition for the proof-of-work puzzle.

DETAILED DESCRIPTION OF AN EXEMPLARY EMBODIMENT

A. Overview

Figure 1:
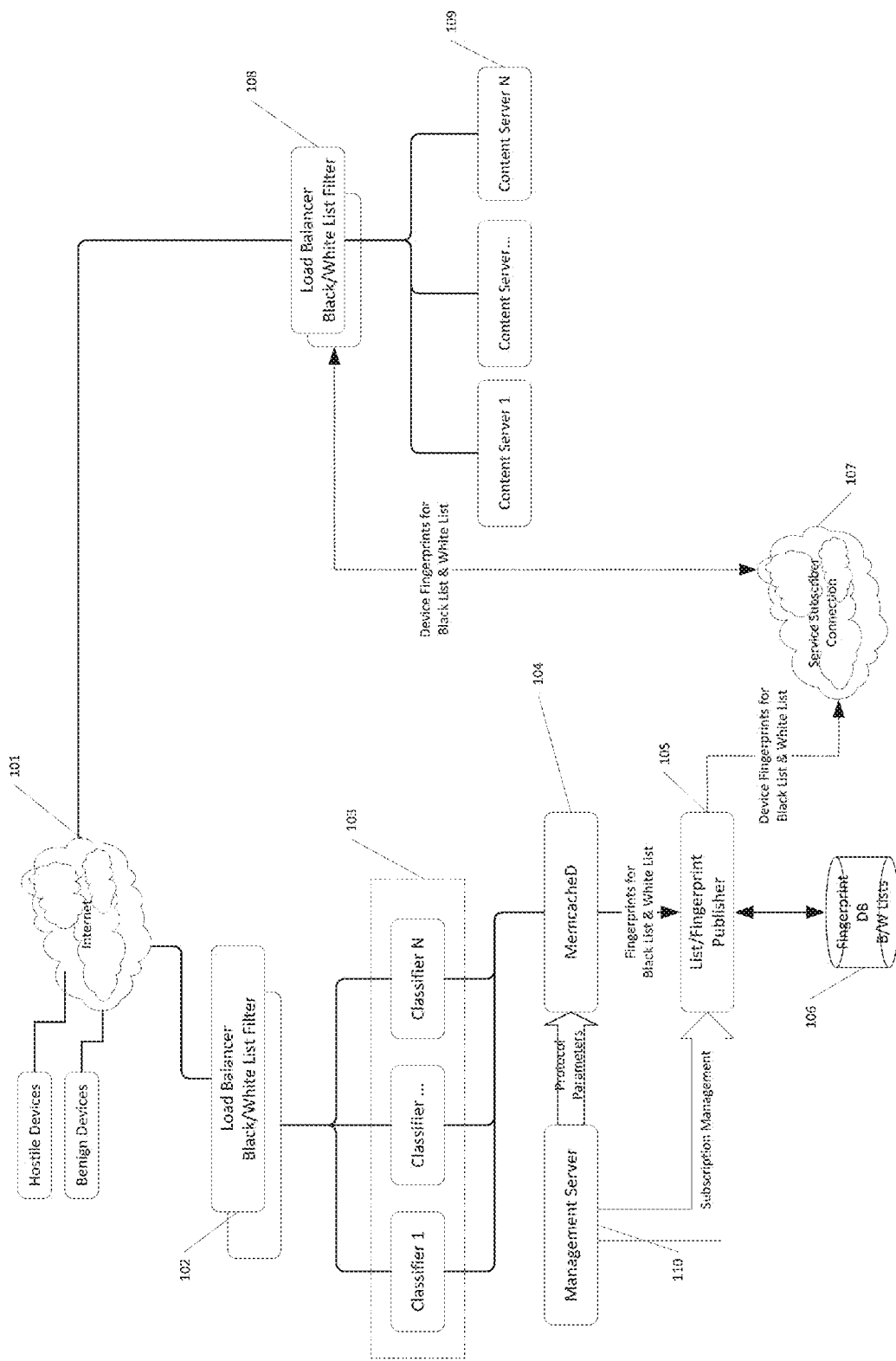
FIG. 1 is a block diagram illustrating the overall architecture of the present systems and methods as a multi-subscriber device classification service.

Turning now descriptively to the drawings, in which similar reference characters denote similar elements throughout the several views, the figures illustrate 1) a proof-of-work protocol, 2) a method for adjusting a device's "attacker score" based on its protocol behavior, 3) a method for detecting tampering of puzzle parameters, 4) a method for limiting request rates of both benign and hostile devices, 5) a method for collecting device fingerprints and their associated status from a high-speed memory cache and persisting them to a database, 6) a web services deployment model to provide device classification services to third parties, 7) a method for dissemination of device blacklists and whitelists to all subscribers of the web service, 8) a stand-alone deployment model for classifying requestors of a single web service, and 9) a management server for control of the system parameters to enable various modes of classification and device request rate limiting.

B. Proof of Work Protocol for Device Classification

The proof-of-work protocol is a type of challenge-response authentication method. In this present embodiment, we are seeking to classify an HTTP client (device) as either hostile or benign. A hostile device is one that is engaging in a denial of service attack. A denial of service attack is characterized by a large (flooding) number of HTTP requests against a web server in an attempt overwhelm its processing capacity and take it offline.

The notion of a proof-of-work protocol is that in order to gain access to a service, the requestor must show proof that some computational work has been performed in advance of the request. These protocols generally are based on solving some sort of puzzle which takes some time for the requestor, but takes very little time for the server to verify that the solution is in fact a solution. The asymmetry of the solution time relative to the verification time is what reduces the advantage of a denial-of-service attacker against its target.

The most common proof-of-work puzzles involve finding some string of characters which when appended to a server-provided challenge and then processed by a one-way or digest function product a digest that has a specified number of zeroes in the leading bits of the digest. The number of leading zero bits required is called the difficulty of the puzzle. These puzzles are also called "hash pre-image" puzzles (the input to a transformation function is sometimes called a "pre-image" and its output an "image").

A variation of this puzzle is to require that the binary number represented by the first n bits of the digest be less than or equal to some number. This method provides a more granular control over the computational difficulty than the single difficulty level puzzle. This also improves the chances that a solution to the puzzle exists.

As part of a device classification protocol, the proof-of-work puzzle serves two purposes: 1) determination of a requesting device's capability to solve puzzles, and 2) to limit the rate of requests that a device can make by occupying its central processing unit (CPU) with computational work finding solutions to puzzles. If a device does not attempt to solve the puzzles provided as part of the protocol, it will eventually be classified as hostile.

Turning now to FIG. 4, we provide a description of the proof-of-work protocol. When a requesting device, 401, (a computer running a web browser or similar software), makes an HTTP request of a server, 402, that request will initially be accompanied by no proof-of-work. The server inspects the request for "cookie" elements (403) that are used to communicate the puzzle parameters and solutions between the requesting device and the server. An HTTP cookie is a piece of information issued by a server to a requestor, and is returned on subsequent requests to the server. The presence or absence of the protocol cookies will be used later to determine whether to issue a puzzle to the requestor.

The server now calculates a server-side device fingerprint, 404. The details of this process are discussed in "F. Method for Collecting Device Fingerprints and Their Associated Status from a High-speed Memory Cache and Persisting them to a Database".

The server-side device fingerprint is an identifier of the requestor that is almost surely unique. This device fingerprint is called 'server-side' because it does not require a deep inspection of the requesting computer's characteristics, relying only on information provided in the request itself. We shall refer to this fingerprint henceforth as the SS_fingerprint.

One of the objects of this embodiment is to classify as hostile devices that display polymorphism in their device fingerprint. This will be the case for devices engaged in denial-of-service attacks that attempt to elude detection or classification by making permutations in the User-Agent, Referrer, X-Forwarded-For, and other HTTP header elements. However, all of these polymorphisms are related to the same IP address over time. The degree of polymorphism may be on the order of hundreds of variations for a sophisticated attacker. Given that the attacker will typically generate hundreds of HTTP requests per second during an attack, each of those requests will be identified by a particular fingerprint, and will be classified as hostile within a few iterations of the proof-of-work protocol. Characteristically, attackers will not engage in the execution of client scripting language such as, without limitation, JavaScript or ECMAscript; this behavior causes them to be classified as hostile regardless of the number of polymorphs they exhibit in the server-side fingerprint.

Now, the server examines the request for the presence of a device fingerprint calculated by the execution of a JavaScript script supplied to the requestor by the server. In the initial steps of the protocol this fingerprint will be absent, but will appear in subsequent requests by a requestor that executes JavaScript. Henceforth we will refer to this as the JS_Fingerprint.

Once these preliminary steps have been completed, the server takes the best available device fingerprint (the JS_Fingerprint is preferred over the SS_Fingerprint for this purpose), and checks to see if this fingerprint is a blacklisted fingerprint, 406. If so, the request is dropped and the protocol is terminated. If not, the protocol continues. Now, the server checks to see if the fingerprint is a white-listed fingerprint, 408. If so, the request passes through for continuation of normal processing.

Figure 7:
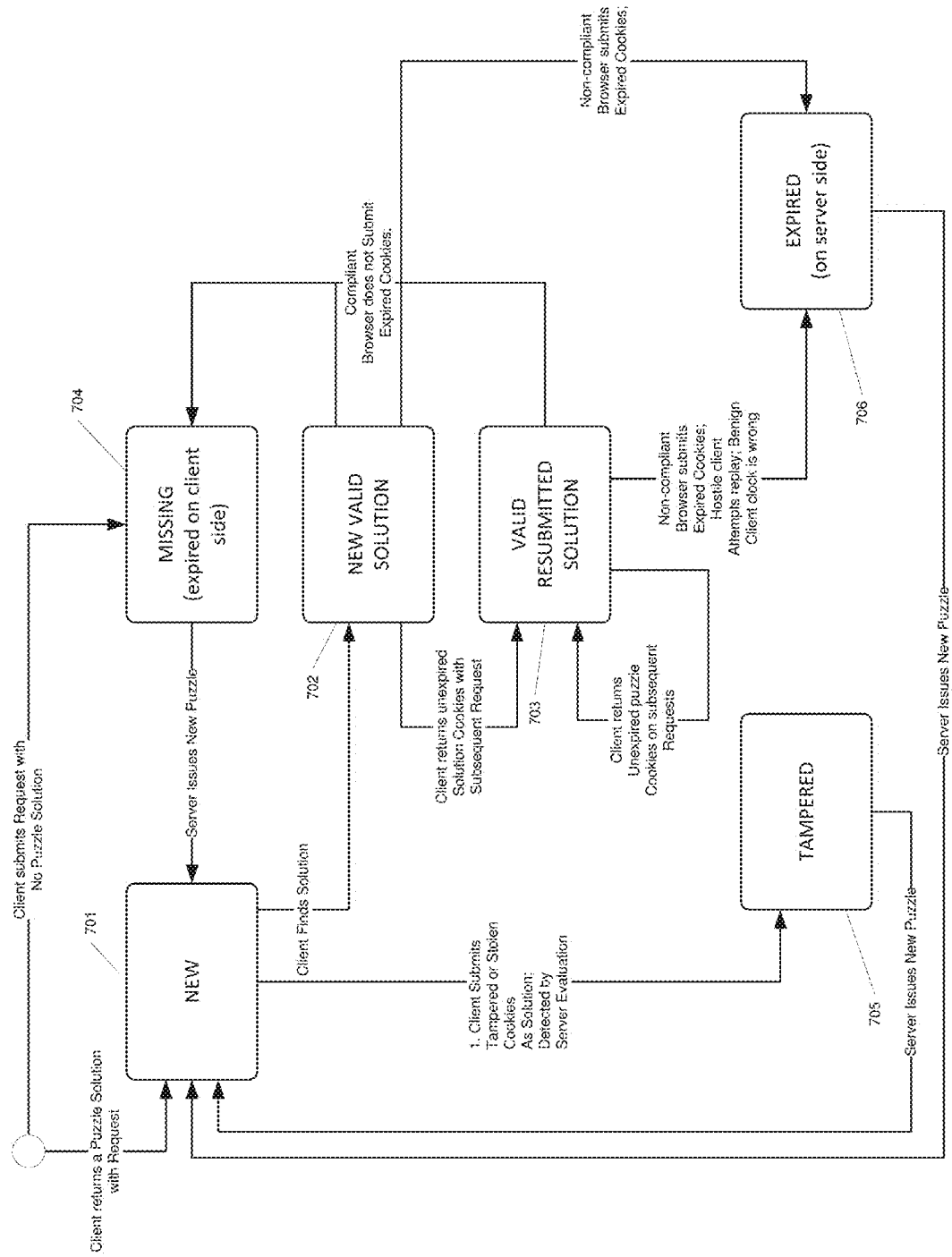
FIG. 7 is a flowchart illustrating a sub-operation of the present systems and methods.

At this point, 409, the request is inspected for the presence of a solution to a previously supplied puzzled. If not, a puzzle is generated based on the following, 410; the puzzle and its solution are represented by cookies (though other methods may be used, including but not limited to URL parameters and embedded constants in JavaScript). Turning to FIG. 7, this corresponds to the MISSING state (704) in the puzzle state transition diagram. The parameters of the proof-of-work protocol are as follows, given by their notation name and corresponding cookie name (any names may be used for the cookies):

$N_s$, POW_NONCE—a random number generated to make each puzzle unique $T_e$, POW_EXPIRATION—a future time after which a solution is considered expired and may not be used as proof-of-work. The expiration time is typically set only far enough in the future to deliver the requested content, perhaps 10 seconds. Web pages generally have dozens of 'referral' elements in them that cause the browser to make additional requests automatically, e.g. for images, ads, and so on.

$G_{d1}$, POW_GPUZ1—The difficulty of the puzzle; in the case of a single-parameter hash pre-image puzzle this is the only parameter of difficulty. It is the required number of leading zero bits in that case. In the two-parameter difficulty puzzle, it is the number of bits to form an integer for evaluation against the value in POW_GPUZ2.

$G_{d2}$, POW_GPUZ2—In the case of the two-parameter puzzle difficulty specification, this is the number that is compared with the leading bits of the solution.

$C_b$, POW_CHALLENGE—This is a random string generated by the server and forms the base of a subsequent full challenge.

$C_s$, POW_CHALLENGE_SERVER—This is the challenge supplied to the requestor by the server. It is a hash of the POW_CHALLENGE_SERVER, an expiration time based on the server's internal clock (POW_EXPIRATION), a nonce (random number, POW_NONCE), the puzzle difficulty parameters (POW_GPUZ1 and POW_GPUZ2), the Internet domain, $D_c$, to which this applies (e.g. *.website.com) and a server-secret, $K_s$. The server-secret is never disclosed, and when appended to the foregoing elements provides a message authentication code (MAC) such that later solutions of the puzzle are known to be tamper-free, authentic, and originated at this system or server. $C_s$=Hash$(N_s, C_b, K_s, T_e, D_c, G_d)$;

POW_SOLUTION_CLIENT_NONCE—In a supplied JavaScript script, the requestor generates an additional random number. This element is appended to the POW_CHALLENGE_SERVER to form the complete challenge POW_CHALLENGE_CLIENT. The purpose of the client nonce is to further randomize the puzzle and reduce attempts by hostile requestors at puzzle replay attacks.

POW_CHALLENGE_CLIENT—This is the challenge for which the requestor must find a solution satisfying the puzzle difficulty requirements.

POW_FINGERPRINT—This is the locally computed device JS_Fingerprint.

POW_SOLUTION_PREIMAGE_PREFIX—This is a solution to the server-supplied proof-of-work puzzle. This value, when appended to the POW_CHALLENGE_CLIENT, and processed with a message digest function (e.g. SHA256) will satisfy the difficulty parameters in POW_GPUZ1 and/or POW_GPUZ2.

In order to detect replay attacks (re-use of puzzle solutions), the server initializes the usage count $C_s$ in a memory cache server to zero, 411. A memory cache server is network-accessible store permitting the storage, retrieval, modification, and expiration of "key-value pairs". This memory cache operates as a "blackboard" for a large number of replicated servers engaged in this protocol. As a defense against denial-of-service attacks, the system is required to process large number of requests simultaneously and be able to share information among all of the servers in the system. At (427) where the challenge usage count is incremented, its value may be compared to a threshold to determine if excessive usage of a challenge is occurring which would indicate a replay attack. This can be confirmed by examining the SS_Fingerprint and JS_Fingerprints associated with challenge; when two or more different fingerprints are submitting solutions to the same challenge, a replay attack is underway. Those devices may then be black-listed.

The server now stores SS_Fingerprint, 412, in the memory cache. The server then initialized the "attack score" to a nominal value, 413, for this device fingerprint in the memory cache.

Now, the server sends the puzzle back to the requestor. In the present embodiment, the HTTP cookie mechanism is used to convey the puzzle. Other embodiments could use what are known as "URL Parameters", where information is appended to the URL returned as part of the server response. Yet other embodiments could embed all of the puzzle parameters in the supplied puzzle solving script. The puzzle solving script language presently used is JavaScript, due to its ubiquity, but other scripting languages including but not limited to Adobe Flash may be used as well.

Upon receipt of the puzzle and its associated solver and device fingerprinting JavaScript, the client sets to work, 412. The client generates its own nonce, $N_c$, 413, appends this to the server challenge, $C_s$, forming the client challenge, $C_c$, and executes the puzzle solving routine, 414. The solver is a loop that iterates over $C_c$, appending the value of the loop counter to the $C_c$, calculating the digest (hash) and evaluating the number of leading zeroes (POW_GPUZ1) for a single-difficulty type puzzle, or comparing the value of leading bits against the evaluation criteria (POW_GPUZ2) for a two-parameter level of difficulty puzzle. If the criteria are satisfied, a solution has been found; otherwise iteration continues. Puzzles in general must meet the requirement of solubility in order to avoid infinite looping on the part of the requestor.

Once the solution has been found, the script now computes the value of JS_Fingerprint as the requestor's device fingerprint. The script now executes a reload of the current URL (the original request), 415. Now however, the request for the same (previous) URL will also contain the cookie supplied by the server (described above), plus three additional cookies comprising the JS_Fingerprint. The three cookies represent the client challenge, $C_c$, a solution S, and the JS_Fingerprint. This cookie-returning behavior by the browser is standards-compliant (IETF Request for Comments (RFC) 2161).

So far, we have described the behavior of a benign, or non-hostile, device. We will discuss the hostile device behavior later. A benign device executes the server-supplied puzzle solver and device fingerprinting routines, and returns puzzle solutions with subsequent requests (FIG. 7, 702). At this point the device has been neither blacklisted nor whitelisted. It is still undergoing classification. The flow in the protocol now returns to 403, and proceeds as before until reaching 416 where the solution begins verification by the server.

At 416 the proper set of puzzle and solution parameters is checked. Next, at 417, the value of $T_s$ as represented in the POW_EXPIRATION cookie is compared against the current value of the server's clock to determine if the solution is expired. The lifetime of a solution does not depend on the requesting computer's clock, nor any synchronization between the server and requestor clocks. The puzzle cookies themselves are set with an expiration time that is relative to the requestor's clock (there is a general expectation among networked computers that their clocks are in general agreement, say within seconds, but drifts or errors of minutes are possible). A standards-compliant HTTP browser will not send expired cookies with a request, based on its local clock value. To allow for significant drifts between the server and any number of requestors, the cookie expiration times are set far enough into the future to allow them to be returned as part of the second request for the URL. The actual expiration of the puzzle solution, however, depends only on the server's clock. If the solution is expired (FIG. 7, 706), processing is directed to (432), which we will discuss later. For the case of an unexpired solution, processing continues to 418.

Now, the first of three tamper detection checks are performed. These are described more fully in "D. Method for Detecting Tampering of Puzzle Parameters". As these tamper detection checks are passed (418, 420, 422), and a solution is verified (425), the request is passed through this protocol for normal processing (435). If any of the checks fail, processing is directed to 432. The puzzle state is set to TAMPERED (FIG. 7, 705).

At 426, the server checks to see if the server challenge $C_s$ is in the memory cache. If so, the usage of the challenge is incremented, 427. Otherwise, the usage count of $C_s$ is initialized to 1, as this is the first time the solution has been provided for it. At this point the usage count may be evaluated to determine if it is excessive. The re-use or replay of solutions is explicitly permitted in this protocol to avoid any deleterious effects on the user experience of contemporary web sites. Web sites have much complex structure, various content types (e.g., images, sounds, hypertext), and executable elements (e.g., JavaScript, Flash, etc) which are in many cases intricately dependent on each other for proper function, display, and rendering. A web page may require several dozen or even close to a hundred separate HTTP requests to completely render itself. The present embodiment does not interfere in this process once the proof-of-work has been verified. This is accomplished by establishing the useful life of the solution through its expiration time (typically 10 seconds, though this is an adjustable parameter, suited to a particular site's content and rendering times). If the challenge has been submitted with a solution previously, the puzzle state is set to "VALID RESUBMITTED SOLUTION", FIG. 7 (703).

At this point in the protocol, the state of the puzzle has been determined as one of the states in FIG. 7. Now, the attacker score for the device is adjusted according to the method detailed in "C. Method for Adjusting a Device's "attacker Score" Based on Its Protocol Behavior". In general, where the puzzle state is TAMPERED the attacker score for the device will be increased, and for a state of NEW_VALID_SOLUTION it will be decreased, and for MISSING or VALID_RESUBMITTED_SOLUTION no change will be made. System operators may determine other score adjustments, however, effectuated through the management server (FIG. 1, 110, and FIG. 2, 207).

Now, some response content is returned to the requestor. The particulars of the visible content are unimportant, and even a blank page may be used. Since the objective is to engage a device in the protocol and ultimately classify it, some innocuous web page may be returned. The JavaScript of the puzzle solver and device fingerprinter is added to the basic Hyper Text Markup Language (HTML) of the response; this is the important part of the response. For a human user, they will generally be unaware that device fingerprinting and puzzle-solving is happening, perhaps only a slight delay of a second or two.

Figure 5:
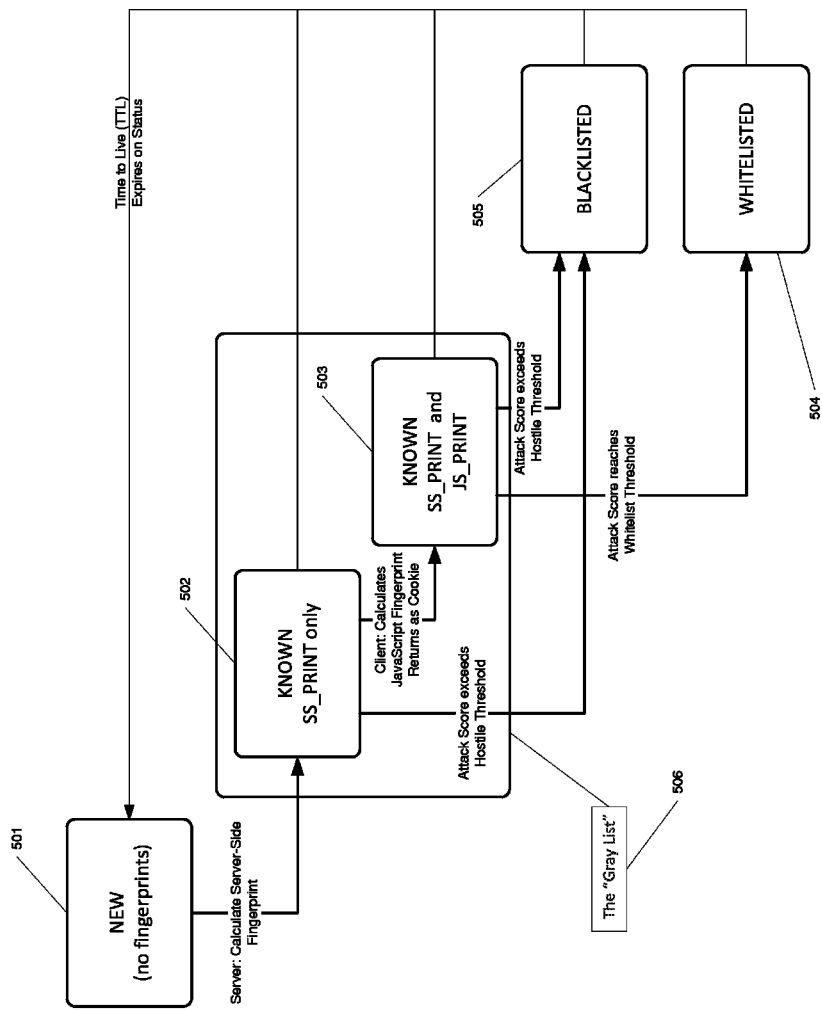
FIG. 5 is a flowchart illustrating a sub-operation of the present systems and methods.
Figure 6:
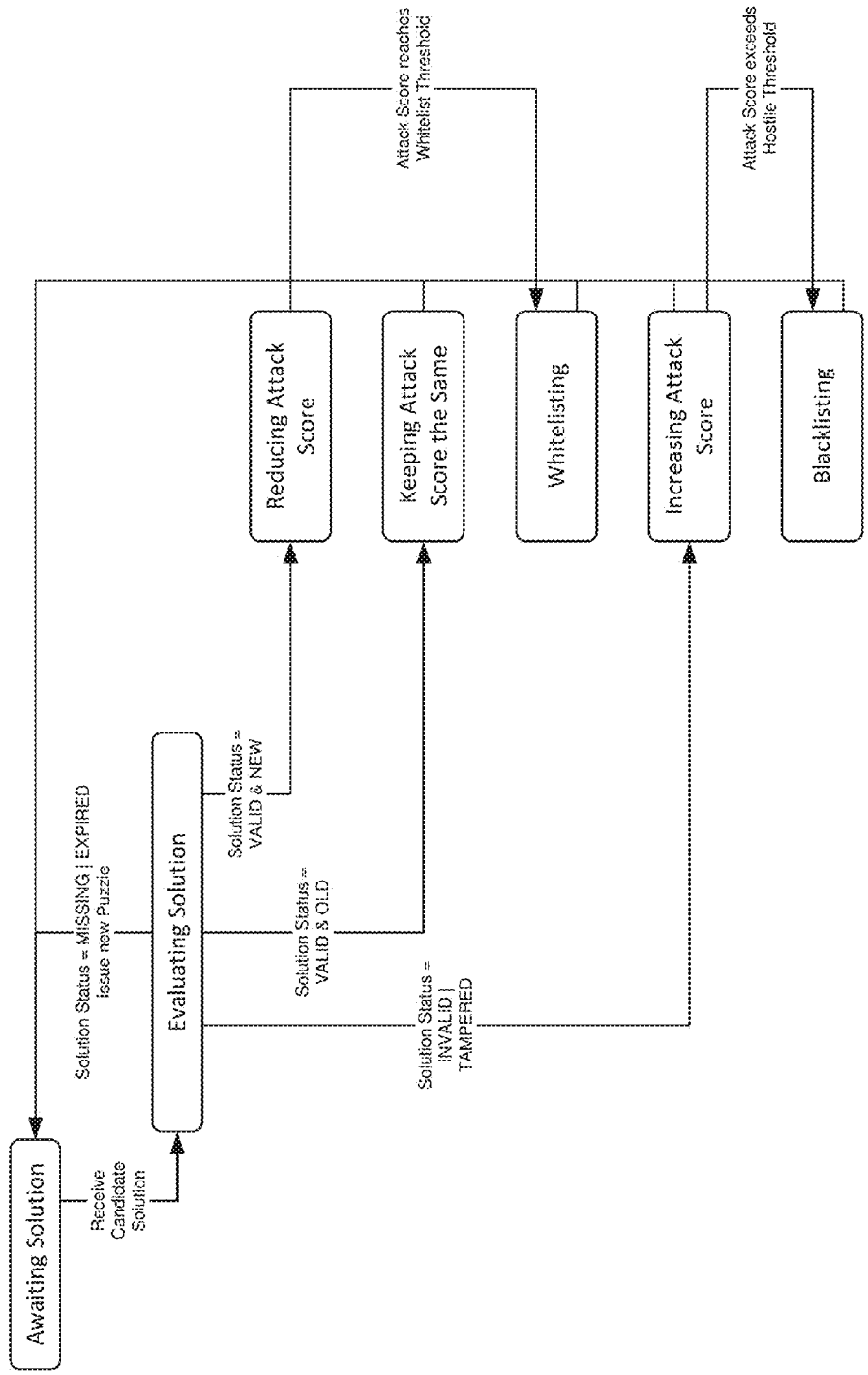
FIG. 6 is a flowchart illustrating a sub-operation of the present systems and methods.

C. Method for Adjusting a Device's "Attacker Score" Based on its Protocol Behavior Each device classified by this embodiment accrues a score ('attacker score') indicative of its maliciousness or lack thereof. Referring to FIG. 5, a state transition diagram, a device not seen by the system (i.e. there are no device fingerprints present) is NEW (501). As a NEW device it is assigned a nominal attacker score.

As described earlier in "B. Proof of Work Protocol", device fingerprints of two types are generated to uniquely identify a device (the server-side fingerprint, SS_Fingerprint, and the more exact JS_Fingerprint). Upon a request of the server by a device, its SS_Fingerprint is computed and stored in the memory cache. Once this value is present in the memory cache, the state of the device transitions to KNOWN:SS_PRINT_ONLY (502). After compliant execution of the puzzle solver and fingerprinting script, the device will transition to KNOWN:SS_PRINT_AND_JS_PRINT (503). At this point, a device known only by its SS_Fingerprint or by that and its JS_Fingerprint is in what may be called the "gray list" (506). The gray list is the set of devices about which a final classification of either hostile of benign has yet to be made. The objective of the attacker score is to resolve the gray list devices into either a black list entry or a white list entry.

As a device participates correctly in the proof-of-work protocol, its attacker score is reduced over successive successful iterations of the proof-of-work protocol. Having seen sufficient evidence of benign behavior confirming the ability of the system to limit its request rate if necessary, the device's attacker score eventually crosses a threshold value thereby placing it on the white list (FIG. 5, 504, FIG. 4, 429, 430, 431).

In the case of a hostile device, protocol violations will occur, resulting in an increase of the attacker score (FIG. 4, 432). Primarily in the case of denial-of-service attackers ("bots") they will fail to execute the server-supplied JavaScript puzzle solver and device fingerprinter. As successive protocol violations occur, the attacker score will eventually cross a threshold thereby placing the device on the black list (FIG. 5, 505, and FIG. 4, 433,434).

The amounts by which the attacker score is reduced or increased are adjustable by the system operator, as are the thresholds for white or black listing (FIG. 4, 430, 433). In addition, the various protocol violations may have individual score increments assigned (e.g. a missing puzzle is not deemed as hostile as a tampered solution). Variation of these parameters adjusts how long it takes for devices to be classified. For example, a single successful puzzle solution might be considered sufficient for whitelisting, and a single failure might result in blacklisting. In general, however, several iterations through proof-of-work protocol are desirable operationally, to account for normal puzzle and cookie expiration events.

D. Method for Detecting Tampering of Puzzle Parameters

During the verification of a puzzle solution, three tamper detection checks are performed. The full challenge claimed by the request to be the basis of the puzzle is recomputed independently by the server from $C_s$ (obtained from the cookie) and the client nonce, $N_c$. The digest (hash) of these values must match $C_c$ for a solution to pass this first tamper detection. The tampering that is detected here is the substitution of an easier $C_s$ or one for which a hostile requestor has already computed a solution. If the challenges match (419), processing continues to 420, otherwise processing is directed to 432.

Considering FIG. 4, at 420, the second tamper detection check is performed. All of the elements forming the server challenge $C_s$, except the server secret $K_s$, are resupplied by the requestor after solving the puzzle. The server challenge is recomputed from the parameters supplied by requestor with the addition of the server's secret key, $C_s$=Hash($N_s,C_b$, $K_s,T_e,D_c,G_d$). The tampering that is detected here is the substitution or alteration of any puzzle parameter that makes it easier to solve or extends its usability period (expiration time). Non-hostile devices will not alter these parameters, but hostile devices may do so in efforts to defeat the protocol. If the challenges match (421), processing continues to 423, otherwise processing is directed to 432.

At 422, the third tamper detection check is performed. Using the now-verified puzzle parameters from 420, the client challenge $C_c$ is recomputed with the client nonce, $N_c$, and compared with the value of $C_c$ supplied by the requestor. The tampering that is being detected here is the substitution or alteration of $C_c$ such that a puzzle may be easier to solve. If the recomputed challenge and the supplied challenge match (423), processing continues to 424, otherwise processing is directed to 432.

Finally, the solution to the puzzle itself is verified by the server (424). The requestor's solution, S, is appended to the now-verified client challenge, $C_c$, and the digest (hash) is computed. In the case of a single difficulty parameter puzzle (as shown in FIG. 4) the resulting digest H=hash($C_c$,S) is inspected to see if the first $G_d$ leading bits are all zero. If so, the solution is valid and processing continues to 426. If not valid, processing is directed to 432. Again, a benign device will perform all of the steps necessary to provide a tamper-free and valid solution to the puzzle supplied by the server.

At each step in the verification, tampering of the solution, seeking to extend its usability, or submitting invalid solutions is deemed to indicate hostile device behavior. Importantly, a device engaged in denial-of-service attacks must, in order to succeed or be effective, be able to issue HTTP requests at a high rate. The time required to solve the puzzles prevents the hostile device from issuing attack requests against its target (the server here). Puzzle difficulty is adjustable by the server. Puzzle solution times will vary according the CPU speed of the requestor device, and the difficulty level required. These times can range from a few microseconds, to many seconds. For example, if a particular difficulty level requires 500 milliseconds (½ of a second) to solve, on average, then the average request rate is limited to 2 per second (1/0.5). Considering that a typical DoS attacking device generates many thousands of requests per second, it will suffer a major degradation in its attack intensity if it complies with this protocol and solves the puzzles. From the attacker's point of view, there are two approaches to get around the protocol. The first approach is to tamper with it, substituting easy but invalid answers, and replaying valid answers alone or in conjunction with a number of collaborating attack devices sharing puzzles and solutions. The second approach is to ignore the protocol entirely. Either of these protocol behaviors is judged hostile and will eventually result in the blacklisting of the device.

E. Method for Limiting Request Rates of Both Benign and Hostile Devices

The method for limiting the request rates of devices is based on the difficulty of the puzzle assigned to a requestor by the server. In turn, the puzzle difficulty is a function of the device's current attacker score. The applicability of this method is only for devices which support and execute server-supplied scripts or programs. In the current embodiment, this requestor-side functionality is based on JavaScript. Other languages may be used, including but not limited to Java, Jscript, VBScript, Flash, languages that compile to JavaScript such as Haxe, CoffeeScript, Kaffeine and so on.

The time required to find a solution to the proof-of-work puzzle is time that cannot be used by the requestor to make HTTP requests against the server. This puzzle-solving time functions as a throttle or rate-limiter. The difficulty level of a puzzle may range from the trivial to the trans-computable. A trivial puzzle would have a difficulty level of 1, and there would be 50% chance a solution will be found on the first attempt. This is because the digest function produces what seem to be random bits, ones and zeroes alternating in an unpredictable manner. So, from a computational complexity perspective, the probability of any single bit in the digest being a one or zero is ½. Obtaining a solution to a puzzle with difficulty level of n therefore is equivalent to flipping a fair coin n times and each time obtaining the same result (all heads or all tails). This is known as a Bernoulli trial. The probability of success on any single solution is then $½^n$ and the expected number of attempts before a solution is found is simply $2^n$. For example, a puzzle with difficulty level of 18 will require on average $2^{18}$ (262,144) attempts to find a solution. This is a relatively difficult puzzle for a contemporary computer. However, computational difficulty grows exponentially with the required number of leading zero bits.

Limiting of the request rate then is based on selecting a difficulty level that achieves the desired request rate. Without exact knowledge of the computational power of the requestor device, we can achieve relative rate limiting as opposed to exact rate limiting. The nominal attacker score for NEW devices (FIG. 5, 501) will have a corresponding difficulty level for puzzles issued to that device (the attacker score and the puzzle difficulty are not in general the same value). The nominal difficulty would be selected to require about 500 milliseconds on typical desktop computers. As the device increases its attacker score, the puzzle difficulty values increase. As the device decreases its attacker score, the puzzles become easier. One method for implementation of this is to maintain a table of attacker scores (or score ranges) and their corresponding puzzle difficulty levels.

F. Method for Collecting Device Fingerprints and their Associated Status from a High-Speed Memory Cache and Persisting them to a Database The device fingerprint is used to uniquely identify and differentiate devices. As devices participate in the proof-ofwork protocol, we must keep track of their attacker score. Later, the presence of a device fingerprint on a black or white list will be used to reject or accept requests respectively. The generation, collection, classification, persistence and distribution of device fingerprints classified as hostile or benign is an object of the embodiment.

Referring now to FIG. 1, the "classifiers" (103) are an array of one or more servers providing an element of the embodiment of the embodiment. Collectively the classification servers comprise the classification service. The classification servers perform the proof-of-work protocol described in "B. Proof of Work Protocol for Device Classification" with the requestors. The memory cache ("Memcached") (104) is a network service available to all of the classification servers. The memory cache stores pairs of keys and values and supports operations such as, without limitation, update, delete, and expiration of the data. In the present embodiment, the memory cache function is provided by Memcached (www.memcached.org), but other implementations including but not limited to CouchBase may be used as well. The memory cache is used to provide a high-speed shared memory among the classification servers. Requests are initially handled by the load balancer(s) (102), and depending on the load balancer used, successive requests by the same device may or may not be directed to the same classification server ("sticky" or "non-sticky" load balancing). In the present embodiment, the load balancer function is provided by HAProxy, though other load balancers, including but not limited to F5 Local Traffic Manager, Radware AppDirector, INGnx, CoyotePoint Equalizer, Barracuda Load Balancer, etc. may be used. A common requirement for any front-end load balancer and filter element is the ability to compute the server-side fingerprint (SS_Fingerprint), inspect HTTP cookies, and filter according to access control lists. All of the example possible balancer/filter elements cited support this minimal functionality.

Figure 3A:
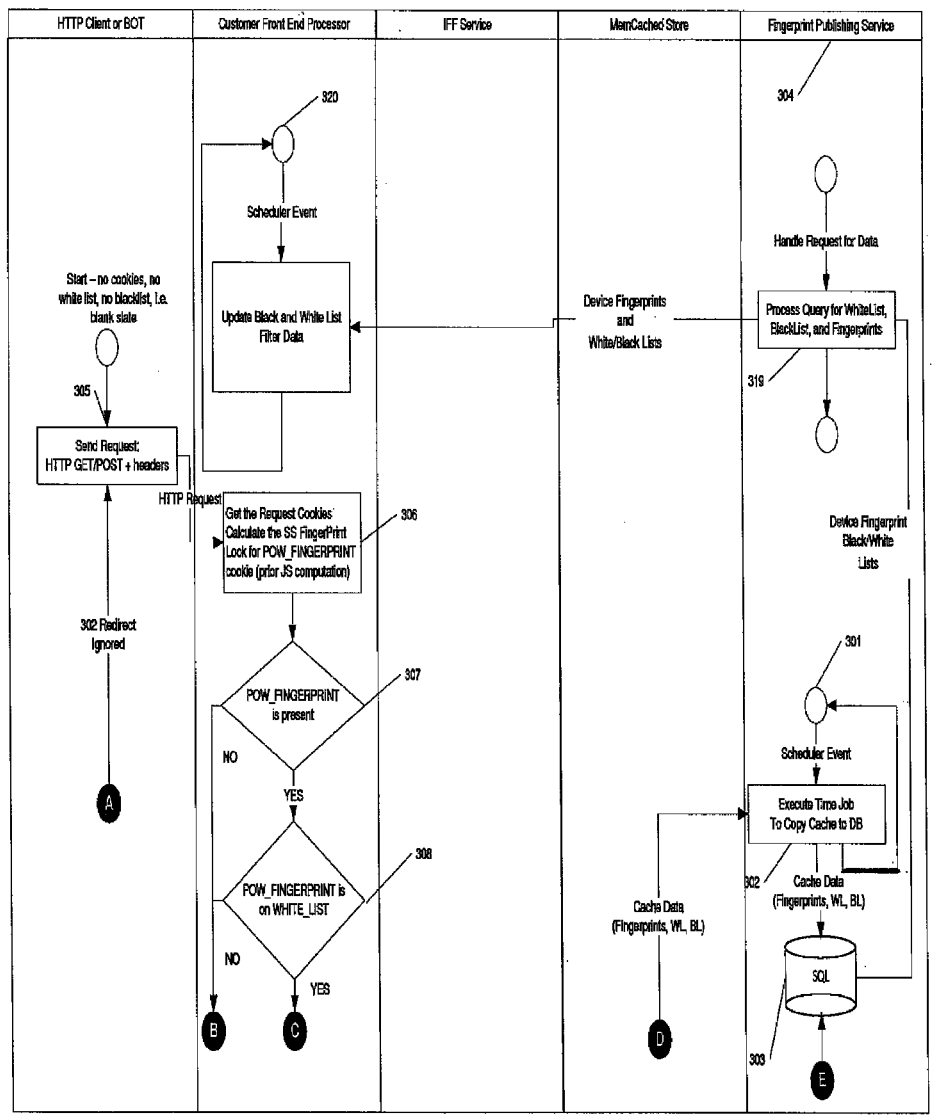
FIG. 3A is a flowchart (an "activity diagram" which is a multiple side-by-side flowchart divided into lanes illustrating both control flow in a lane and data flows between the entities performing the actions in each lane) showing the operation of the proof-of-work protocol of the present systems and methods when deployed as web service for multiple subscribers (this corresponds to the architecture diagram in FIG. 1)
Figure 3B:
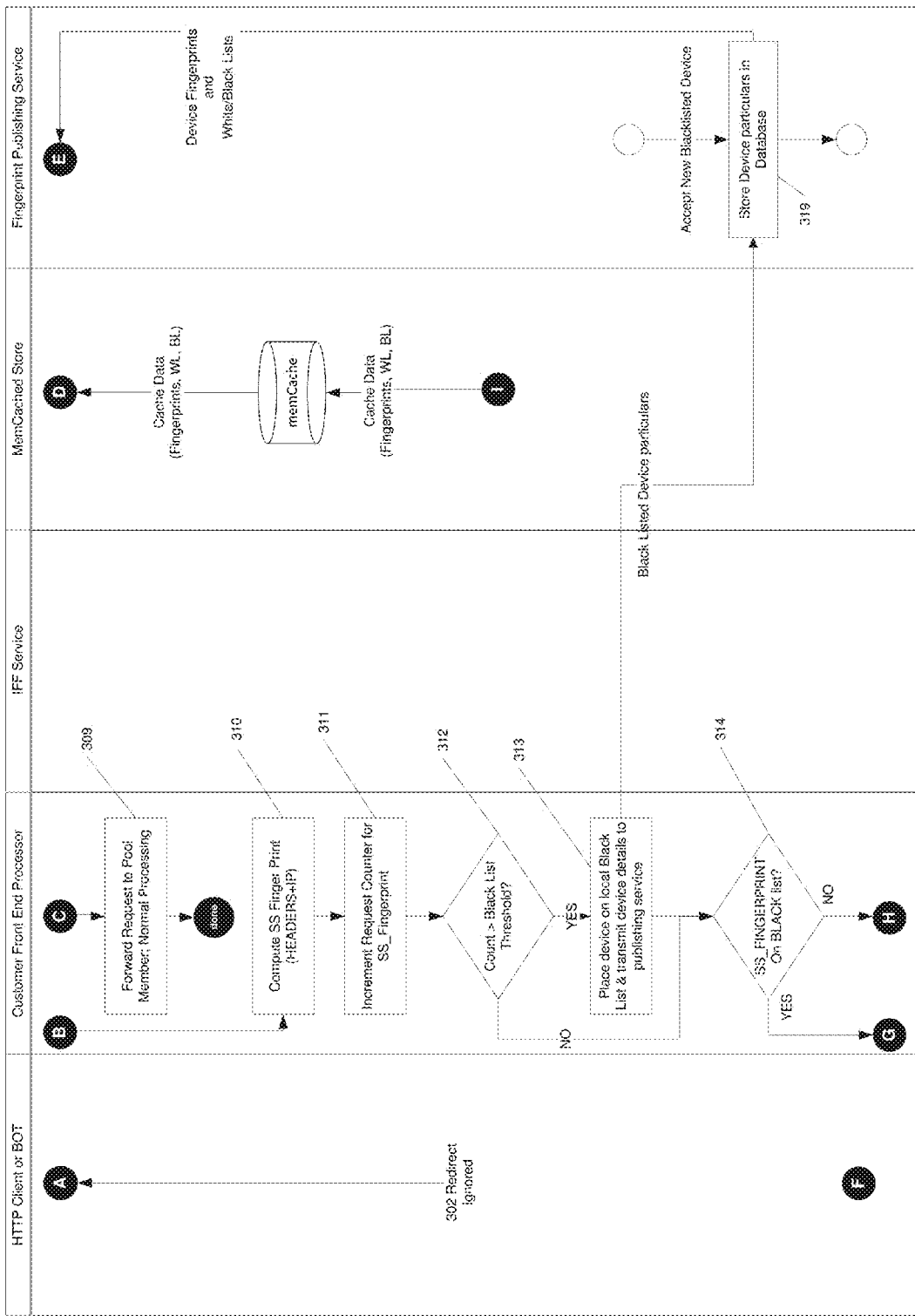
FIG. 3B is a flowchart (an "activity diagram" which is a multiple side-by-side flowchart divided into lanes illustrating both control flow in a lane and data flows between the entities performing the actions in each lane) showing the operation of the proof-of-work protocol of the present systems and methods when deployed as web service for multiple subscribers (this corresponds to the architecture diagram in FIG. 1)
Figure 4A:
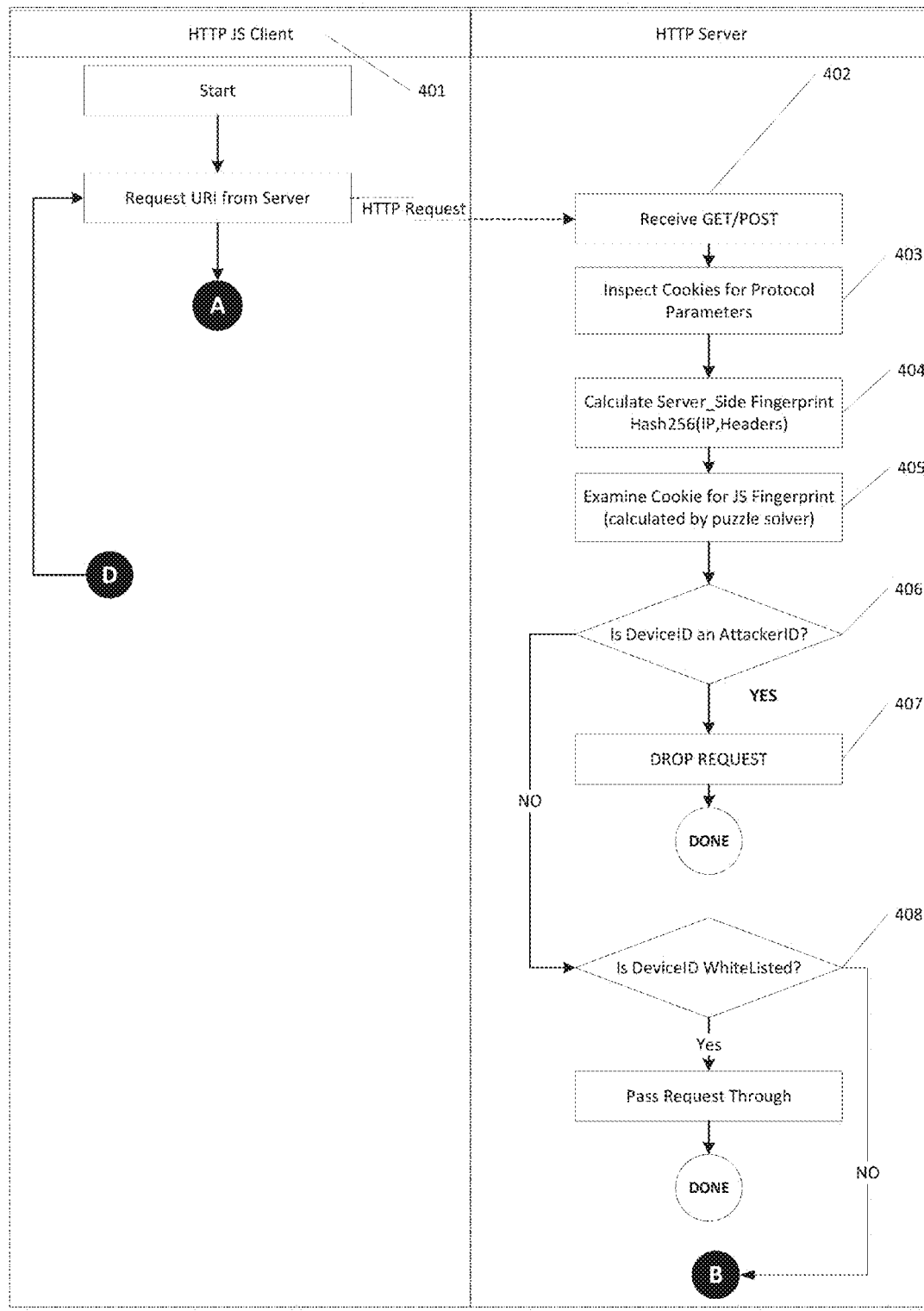
FIG. 4A is a flowchart (an "activity diagram" which is a multiple side-by-side flowchart divided into lanes illustrating both control flow in a lane and data flows between the entities performing the actions in each lane) showing diagram showing the detailed operation of the proof-of-work protocol of the systems and methods between a client and a host.
Figure 4B:
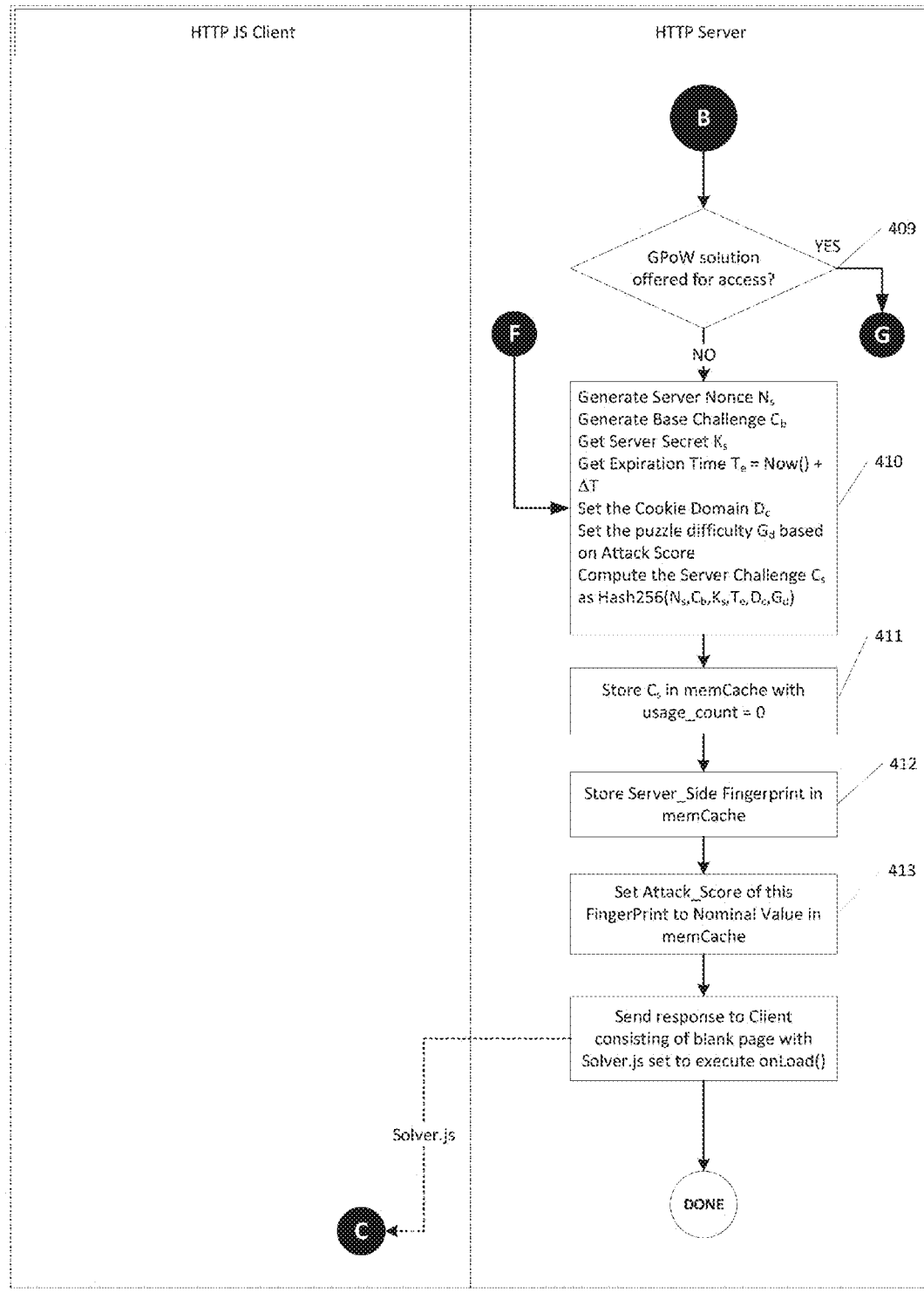
FIG. 4B is a flowchart (an "activity diagram" which is a multiple side-by-side flowchart divided into lanes illustrating both control flow in a lane and data flows between the entities performing the actions in each lane) showing diagram showing the detailed operation of the proof-of-work protocol of the systems and methods between a client and a host.
Figure 4C:
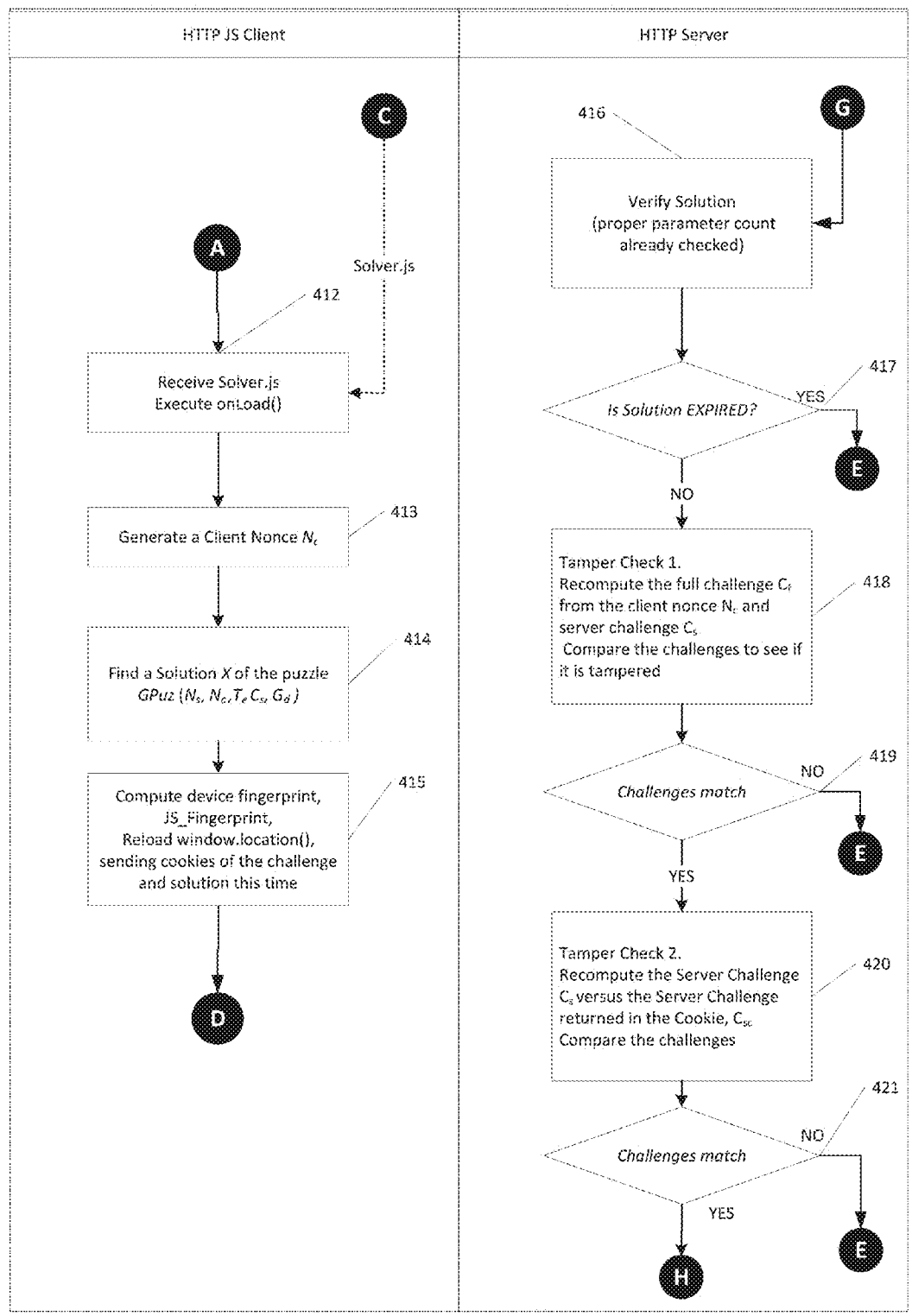
FIG. 4C is a flowchart (an "activity diagram" which is a multiple side-by-side flowchart divided into lanes illustrating both control flow in a lane and data flows between the entities performing the actions in each lane) showing diagram showing the detailed operation of the proof-of-work protocol of the systems and methods between a client and a host.
Figure 4D:
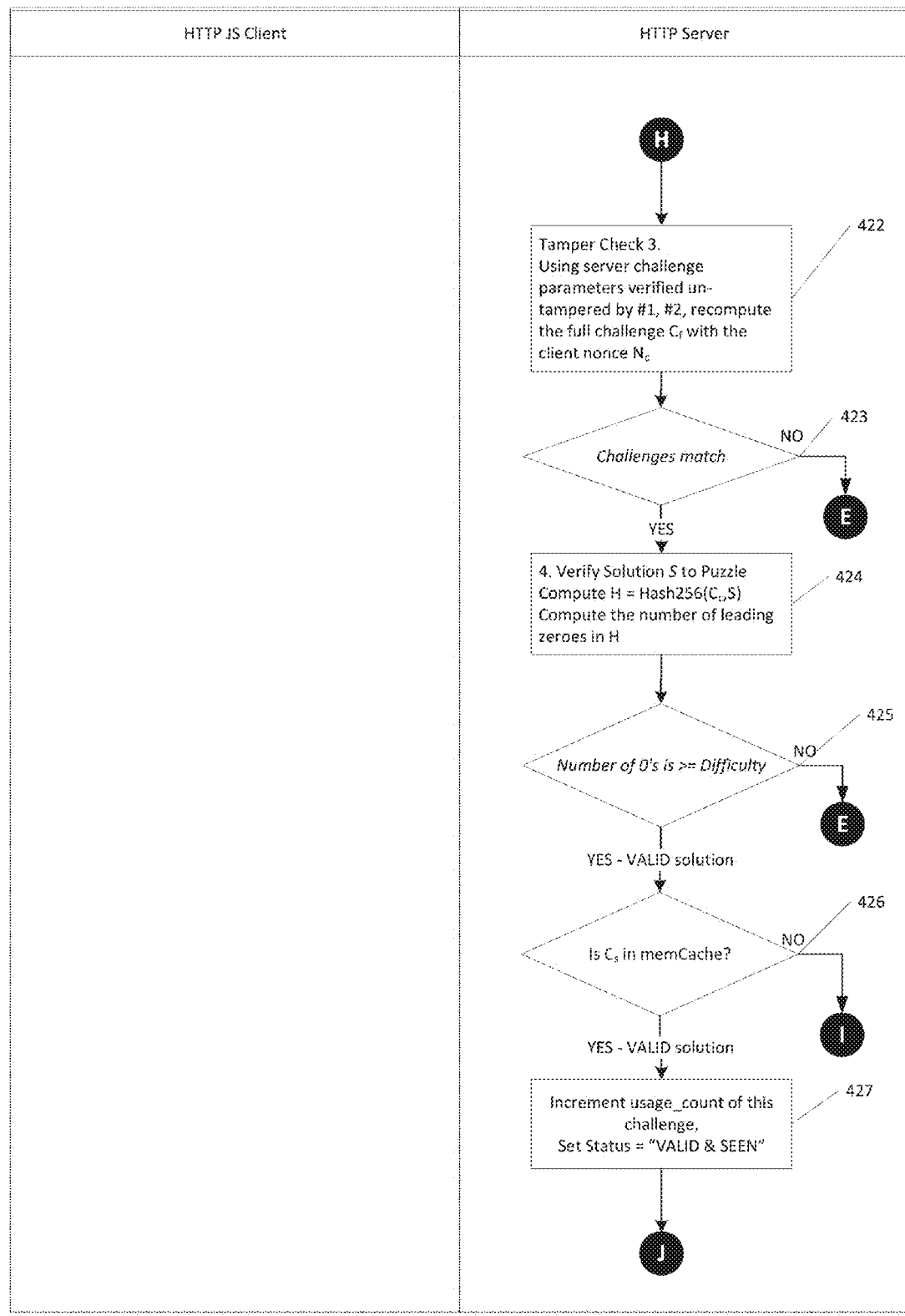
FIG. 4D is a flowchart (an "activity diagram" which is a multiple side-by-side flowchart divided into lanes illustrating both control flow in a lane and data flows between the entities performing the actions in each lane) showing diagram showing the detailed operation of the proof-of-work protocol of the systems and methods between a client and a host.
Figure 4E:
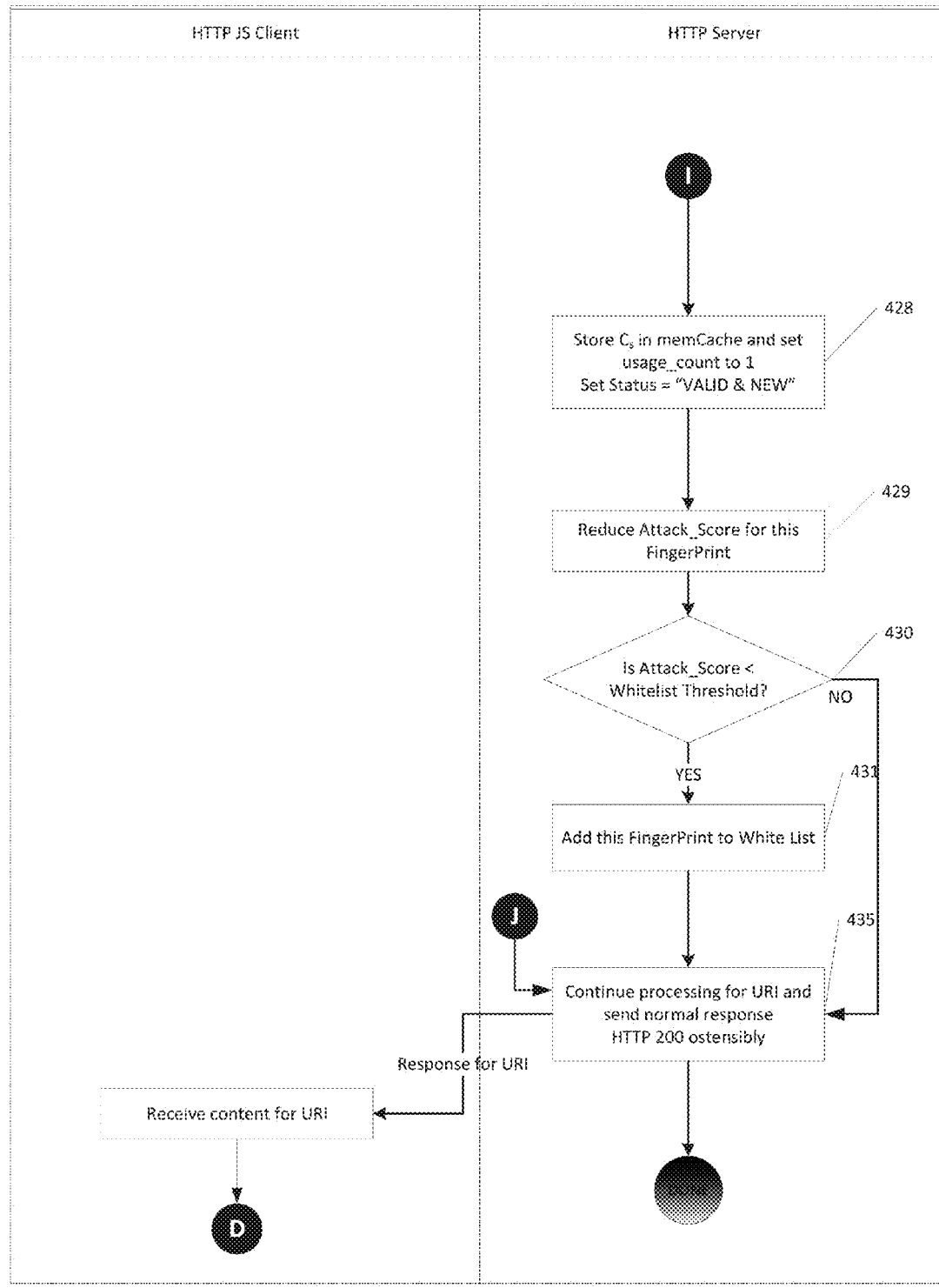
FIG. 4E is a flowchart (an "activity diagram" which is a multiple side-by-side flowchart divided into lanes illustrating both control flow in a lane and data flows between the entities performing the actions in each lane) showing diagram showing the detailed operation of the proof-of-work protocol of the systems and methods between a client and a host.
Figure 4F:
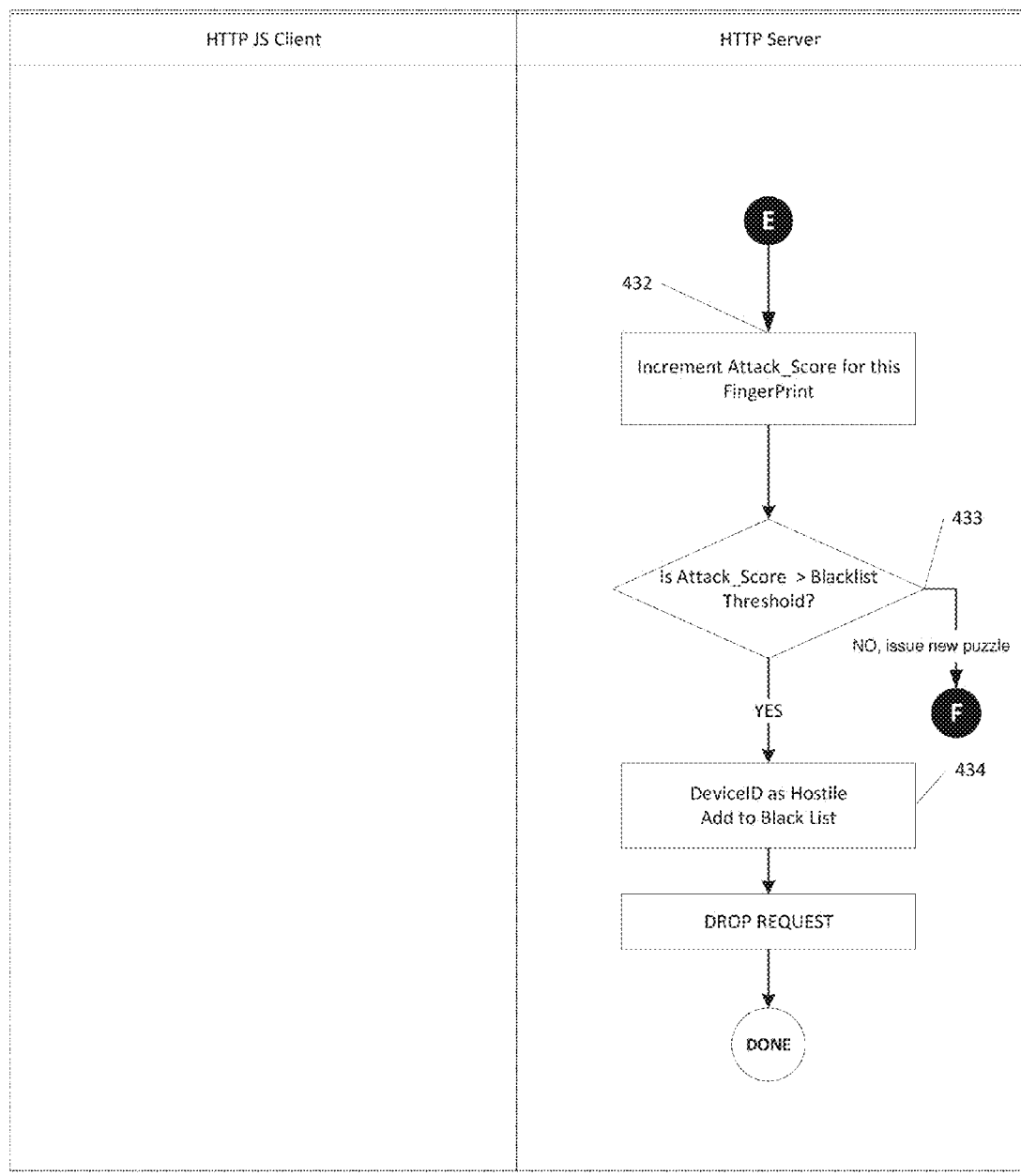
FIG. 4F is a flowchart (an "activity diagram" which is a multiple side-by-side flowchart divided into lanes illustrating both control flow in a lane and data flows between the entities performing the actions in each lane) showing diagram showing the detailed operation of the proof-of-work protocol of the systems and methods between a client and a host.

As devices are gradually white-listed or black-listed, this status information is initially stored in the memory cache (104, 204). However, the memory cache is a volatile and non-persistent data store, so its contents must be periodically transferred to a database that provides persistent and reliable storage of the data (106). This is accomplished by the fingerprint publishing server (105). Referring now to FIG. 3, periodically (301), preferably but not limitingly by means of an automatic task scheduler such as, without limitation, Unix/Linux cron, Autosys, or Windows Task Manager, the fingerprint publishing server queries all of the key-value pairs from the memory cache, performs any required transformations, and then adds new fingerprints or updates existing fingerprints in a database (302, 303, 106, 206). In the present embodiment, the database function is provided by MySQL, but other databases including but not limited to Oracle RDB, Microsoft SQL Server, Sybase, and so on could be used in alternative embodiments.

The fingerprint database comprises at a minimum the following tables: 1) a white list of device ID (Identifier) considered non-hostile, 2) a black list of device IDs considered hostile. Each list has at least the device fingerprint, IP address, time stamps of first and last seen events, the attacker score, and the time stamp of when it was placed on the list.

In the fingerprint dissemination method described more fully in "I. Method for Dissemination of Device Blacklists and Whitelists to All Subscribers of the Web Service", the fingerprint publishing service (304) provides black and white lists of device fingerprints from this database to service subscribers.

G. Web Services Deployment Model to Provide Device Classification Services to Third Parties The web services deployment model to provide device classification services to third parties provides a method for service subscribers to defend their web services from denial-of-service attacks without requiring extensive modifications to their own web services. In addition, as members of a set of subscribers, each member benefits from accumulation of device fingerprints of hostile devices, potentially before these devices engage in attacks against them. By having advance identification of attacker devices, service subscribers can deploy forward filtering elements to blunt future attacks ("forewarned is forearmed").

Turning to FIGS. 1 and 3 now (FIG. 3 is similar to FIG. 4, with some details elided to provide clarity on the operation of the web service rather than the proof-of-work protocol for device classification), which respectively show the web services deployment architecture and its related activity model, we consider an initial request by an unclassified device in FIG. 3, 305. As in 403-408, at 306-309 already white-listed devices pass the filtering function deployed in the third-party subscriber's Load-Balancer/Filter at 108. The HTTP request is forwarded by the Load-Balancer/Filter to a content server (109, 309).

Otherwise, the SS_Fingerprint is computed at 310, and if present on the local black list (314,317) the request is dropped. For a hostile device that does not follow the HTTP Redirect instruction (315) it will reappear in this processing shortly. Each time, a counter of the number of times this device identified by SS_Fingerprint fails to present a JS_Fingerprint is incremented (311). Now, after exceeding an adjustable threshold, the SS_Fingerprint is classified as a hostile device and placed on the blacklist (313) maintained by the fingerprint publishing service. Hostile devices will sometimes engage in behavior to alter their SS_Fingerprint, usually by varying the User-Agent string. In practice, an attacking computer will randomly select a User-Agent from a small pre-defined set (~10). Each of these variations in SS_Fingerprint will eventually be black-listed as they are repeatedly presented without any proof-of-work, however.

If the device is on the local black list of the subscriber's front-end filter, the request is dropped (317).

If the device is as yet unclassified, an HTTP Redirect/302 response (312) is returned to the device to direct it to the device classification service. There are several possible behaviors of requesting devices at this point: 1) the requestor will follow the HTTP Redirect instruction to start engaging in the proof-of-work protocol with device classification service (this may be done by both devices eventually classified as hostile or non-hostile) 2) the requestor will ignore the HTTP Redirect instruction and make yet another request (305) against the subscriber's front-end Load-Balancer/Filter (108). As noted above, this behavior will eventually result in the device being classified as hostile and entered onto a local black list at the front-end filter (108, 313). The subscriber's front-end filter transmits black-listed device fingerprint and other particulars (e.g., timestamps, IP, expiration date, fingerprint type) to the fingerprint publishing service (107).

If the device follows the HTTP Redirect (Response Code 302) from the subscriber's front-end filter, it will make a subsequent HTTP request of the classification servers (103). At this point, the device will be engaged in the proof-of-work protocol for device classification described in "B. Proof of Work Protocol for Device Classification". The device at this point may or may not cooperate with the protocol; cooperating devices will eventually be white-listed and non-cooperating devices will be black-listed. In practice, hostile devices may follow the HTTP 302 Redirect instruction at (315), but will fail to execute JavaScript proof-of-work scripts. They may either continue working against the classification servers, or return to the subscriber's front-end. Either way, because the SS_Fingerprint is computed in an identical manner by both the classification service and the fingerprinting routine deployed at the subscriber's front-end filter, the hostile devices will be blacklisted by either or both the classification service or the subscriber front-end filter.

Devices successfully solving puzzles while engaged in the proof-of-work protocol with the classification servers will eventually be white-listed.

It is conceivable that a hostile device will initially cooperate with the proof-of-work protocol in order to 'sneak' onto the white list. Once white-listed, it would then launch an attack with a high request rate against a target. This fact will normally be detected by the operational monitoring systems and personnel, however. The operational response in this case is to invalidate the current whitelist used by the front-end filter (102, 202), and cause all subsequent requesting devices to undergo re-classification.

From time to time, preferably but not limitingly according to an automatic task scheduler, the subscriber front-end filter updates (320, 108) its white and black list data (which may be in the form of access control lists or ACLs) from the fingerprint publishing service (319). This method is described more fully in "I. Method for Dissemination of Device Blacklists and Whitelists to All Subscribers of the Web Service". As there are potentially many subscribers to the fingerprint publishing service, each subscriber benefits from the device classifications performed on the behalf of other subscribers.

H. Stand-Alone Deployment Model to Provide Device Classification Services to a Single Domain Turning now to FIG. 2, a deployment architecture for a stand-alone system for device classification for a single domain is shown. By single domain, we mean any web services sharing a common internet domain name, e.g. ".uspto.gov" or ".financialservices.com". This is based on the behavior of standard-compliant web browsers (requesting devices) to return cookies to any server in such a domain name space. The proof-of-work protocol sets and reads cookies on either a domain-level basis or optionally on a per-service name basis.

The stand-alone deployment may be used where for various reasons it is not feasible or permitted to use the classification web service. One example of such a situation might be a government or military system where policies prohibit communication with external services. Another example would be the presence of an internal security policy requiring all critical services for maintaining system availability (which this classification service is) be operated under the physical control of the enterprise IT staff.

The stand-alone deployment model provides all of the same functions as the web services model described fully in "G. Web Services Deployment Model To Provide Device Classification Services To Third Parties". In addition, the stand-alone model provides functionality at least for 1) the ability to immediately invalidate all white and black lists and initiate reclassification all new requestors, and 2) the ability to engage hostile but JavaScript-compliant attackers in the rate-limiting features of the proof-of-work protocol.

Again turning to FIG. 2, the stand-alone deployment model comprises one or more front-end load-balancer/filter devices (202) as described in "G. Web Services Deployment Model To Provide Device Classification Services To Third Parties", a classification filter software element (203), and content servers (208). The other elements of the classification service (204,205,206,207) are the same as for the web services deployment model. The content servers (208) may be of various types, but are in general web servers running the HTTP protocol and capable of implementing a request filter.

In this model, the classification function is provided by installing the proof-of-work protocol, attacker score adjustment, and black/white listing functions as a server request filter. A server request filter is a pre-processor for HTTP requests, performing its actions before the usual handling of the request occurs. In the present embodiment, the request filter is implemented, without limitation, as a "PHP autoprepend" element in a "LAMP stack" machine (including without limitation LAMP: Linux, Apache, MySQL, PHP). Additionally, in the present embodiment, the root level .htaccess file identifies all content types of the server as subject to processing by the PHP processor. Alternatively, in a Java application server such as, without limitation, JBOSS, or Oracle WebLogic, the functionality would be implemented as a "servlet filter" element. Other possible variations include but are not limited to C, C#, VB (or other compatible Microsoft languages), and request filters implemented in Microsoft Internet Information Server (IIS). The classification filter performs all of the functions detailed in Sections B., C., D., E., and F.

I. Method for Dissemination of Device Blacklists and Whitelists to all Subscribers of the Web Service This method for dissemination of device blacklists and whitelists to all subscribers of the web service provides a way for service subscribers to benefit from the denial-of-service attack experiences of other subscribers. In practice, denial-of-service attacks have targeted particular industry sectors (e.g. banking), and on successive days attacked first one bank, then another, and another, and so on. The same or largely same set of "bots" (commonly used short form for 'robot') is used by the attackers on successive attacks against different targets. In case of the present systems and methods deployed as a web service with a set of subscribers, the system will classify and obtain device fingerprints (at least the SS_Fingerprint and IP address) of the attacking "bots" on what is called "Day Zero" of the attack. The target on Day Zero will sustain the attack until the system generates the black and white lists and they are deployed into a forward filter (see FIG. 1, 102, and FIG. 2, 202). Other subscribers not targeted on Day Zero will benefit from receiving the black list device fingerprint in advance of an attack on Day One, Day Two, etc. These subscribers can then efficiently filter requests based on these lists.

The method for dissemination of the black and white lists in the present embodiment of the systems and methods is as a web service. A web server accepts requests for the lists from a subscriber and returns the lists. A subscriber may request a complete set of black and white lists, or may select a subset based on date, time, attacker score, updates since last request, country of origin based on IP address mapping, and parameters of their subscription. The subscriber presents a credential in the form of, for example, user ID and password, or client certificate (e.g., X.509), or a one-time token value (e.g., RSA token) to gain access to the publishing service. The subscriber may also select a format for the list, including but not limited to, 1) a text file 2) a comma-separated values file 3) hypertext markup language (HTML) 4) standard query language (SQL) 5) .htaccess deny and .htaccess allow 6) Web.config allow and Web.config deny 7) IP ranges 8) Decimal/CIDR IP notation 8) Cisco ACL.

Other possible methods for dissemination of the black and white lists may include, without limitation, 1) direct database connections 2) file transfers through File Transfer Protocol (FTP), Secure File Transfer Protocol (SFTP) and other variants 3) file transfers through Connect:Direct Network Data Mover (NDM) 4) delivery of compact data disks, flash memory drives, secure digital cards or other portable data storage devices, and 5) electronic mail attachments.

J. Management Server for Control of the System Parameters

Figure 2:
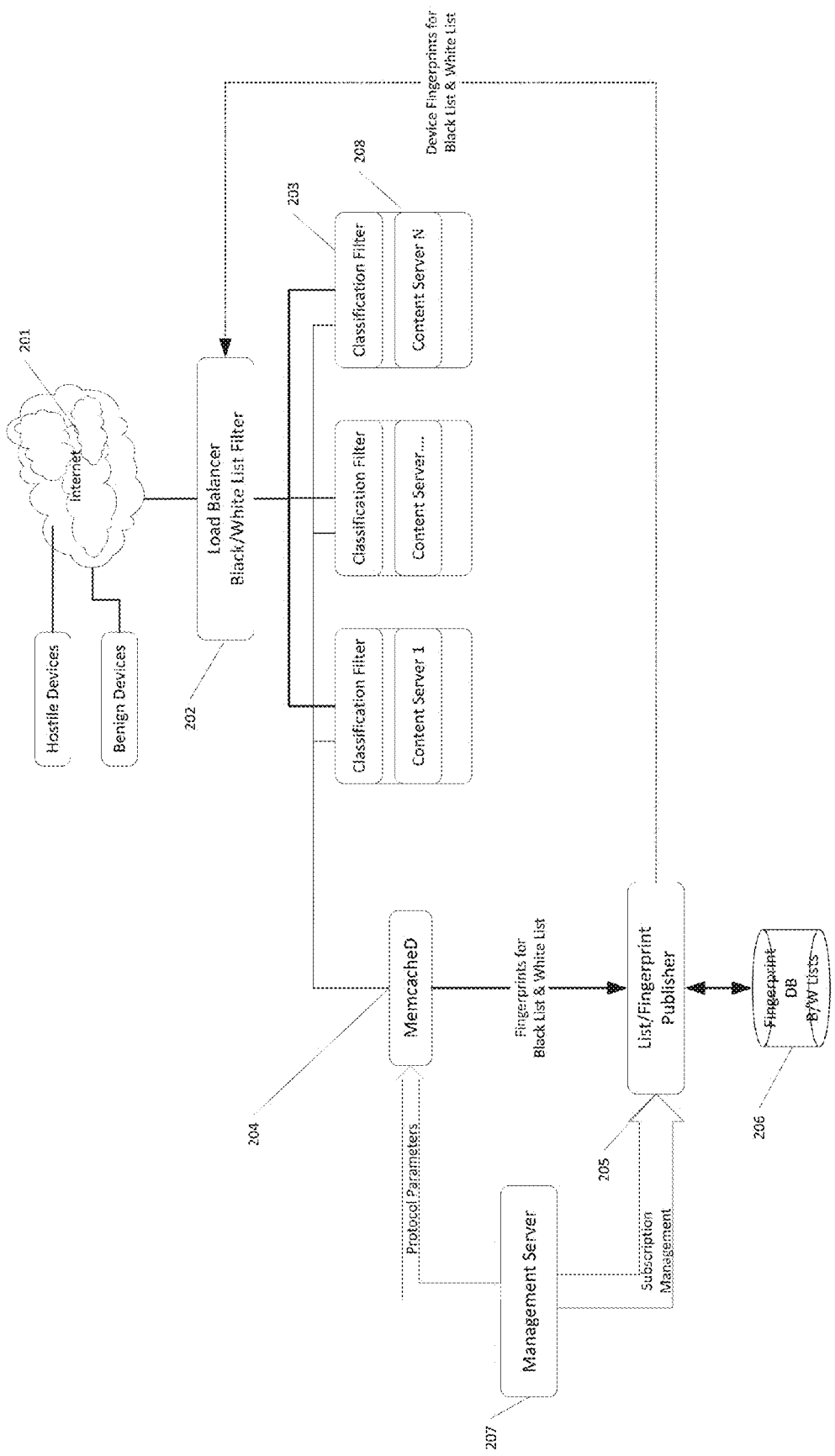
FIG. 2 is a block diagram illustrating the overall of the present systems and methods as a stand-alone system.

Turning to FIGS. 1 and 2, a management server (110, 207) comprises an element of the web services and stand-alone deployment models. The management server provides an interface for system operators to set, inspect, and modify various parameters of the classification system. In each deployment model, the setting, inspection, and modification of system parameters applies to: 1) the server secret, $K_s$, 2) the expiration time for puzzle solutions, $T_e$ 3) the nominal attack score 4) the puzzle difficulty level parameter(s) associated with each score value or range of score values, and 5) the score increments or decrements for each of the state transitions in the proof-of-work protocol as shown in FIG. 7 (701-706).

The system parameters are placed in the memory cache (104,204) by the management server at system startup or by system operator actions. The classification servers (103) or filters (203) read the various parameters from the memory cache.

By virtue of its placement within the enterprise's infrastructure in the case of the stand-alone deployment model, the system operators may change the server secret, $K_s$, and also invalidate the white list in the event of hostile devices 'sneaking' onto the white list and initiating an attack. This change of the server secret key invalidates all currently valid puzzle solutions and causes all requestors to be treated as "new" (FIG. 5) and undergo reclassification. However, because hostile devices have used a ploy to evade the classification system's protocols, the threshold for whitelisting is made infinitely large so that no whitelisting occurs. In effect, devices remain in the "gray list" (506) or become black-listed until the protocol parameters are changed to permit white-listing to occur. The hostile devices initially gained entry to the white list by impersonating (i.e. solving puzzles) benign or rate-limitable devices. Now, in this operational mode of the system, they will not be whitelisted. The attacker may respond by solving puzzles again in an attempt to become whitelisted, but no whitelisting is permitted, and solving puzzles engages the attacker in request rate limitation as described in "E. Method for Limiting Request Rates of both Benign and Hostile Devices" thereby blunting the attack.

In the case of the web services deployment model sustaining such a masquerade attack, similar operational parameter adjustments may be made by the service operator, in this case on a per-subscriber basis.

K. Connections of Main Elements and Sub-Elements of the Systems and Methods

The main elements of the exemplary embodiments comprise 1) a proof-of-work protocol, 2) a method for adjusting a device's 'attacker score' based on its protocol behavior, 3) a method for detecting tampering of puzzle parameters, 4) a method for limiting request rates of both benign and hostile devices, 5) a method for collecting device fingerprints and their associated status from a high-speed memory cache and persisting them to a database, 6) a web services deployment model to provide device classification services to third parties, and 7) a deployment model of the attacker identification system as a request filter at the front-end of a distributed web services system, 8) a method for dissemination of device blacklists and whitelists to all subscribers of the web service and 9) a management server for control of the system parameters to enable various modes of classification and device request rate limiting.

Sub-elements of the exemplary embodiments comprise 1) a client puzzle (410, and FIG. 7) 2) two methods for device fingerprinting (404,415) 3) a front-end load-balancer and filtering device (102,202) 4) a subscriber load-balancer filter device (108) 5) classification servers (103) and classification filters (203) 6) a networked high-speed memory cache (104,204) 7) HTTP web content servers (109,208), 8) a device fingerprint and black/white list database (106,206), and 9) a fingerprint publishing service (105,205).

The connections between the main elements and the sub-elements are as follows in the exemplary embodiments:

The proof-of-work protocol (B.) uses a client puzzle to cause a device to expend CPU cycles as part of validating its request on a web service. The proof-of-work protocol also uses the server-side device fingerprinting (404) and client-side fingerprinting (415) to establish a device identifier that is almost surely unique. The proof-of-work protocol is executed by either the classification servers (103) or in an alternative embodiment the classification filter software (203). The proof-of-work protocol uses the high-speed memory cache (104,204) to store and share information among classification servers (103) or classification filters (203). The proof-of-work protocol generates white and black lists of device classifications and stores them in the high-speed memory cache (104,204).

The method of adjusting a device's "attacker score" based on its protocol behavior (C.) uses the networked high-speed memory cache (104,204) to store device attacker scores. The attacker score adjustment method is executed by either the classification servers (103) or in an alternative embodiment the classification filter software (203).

The method for detecting tampering of puzzle parameters (D.) is executed by either the classification servers (103) or in an alternative embodiment the classification filter software (203).

The method for limiting request rates of both benign and hostile devices (E.) uses the client puzzle (410, and FIG. 7) to control request rates of devices, specifically using the difficulty level parameters related to the attacker score. The method for limiting request rates of both benign and hostile devices (E.) is executed by either the classification servers (103) or in an alternative embodiment the classification filter software (203).

The method for collecting device fingerprints and their associated status from a high-speed memory cache and persisting them to a database (F.) transfers data from the networked high-speed memory cache (104,204) to a device fingerprint and black/white list database (106,206) via the fingerprint publishing service(105,205).

The web services deployment model to provide device classification services to third parties (G.) uses sub-elements identified here 1) a client puzzle (410, and FIG. 7) 2) two methods for device fingerprinting (404,415) 3) a front-end load-balancer and filtering device (102) 4) a subscriber load-balancer filter device (108) 5) classification servers (103) 6) a networked high-speed memory cache (104), 7) a device fingerprint and black/white list database (106), and 8) a fingerprint publishing service (105).

The stand-alone deployment model of the attacker identification system as a request filter at the front-end of a distributed web services system (H.) uses 1) a client puzzle (410, and FIG. 7) 2) two methods for device fingerprinting (404,415) 3) a front-end load-balancer and filtering device (102,202) 4) classification filters (203) 5) a networked high-speed memory cache (204) 7) HTTP web content servers (208), 8) a device fingerprint and black/white list database (206), and 9) a fingerprint publishing service (205).

The method for dissemination of device blacklists and whitelists to all subscribers of the web service (I.) uses 1) a device fingerprint and black/white list database (106,206), and 3) a fingerprint publishing service(105,205).

The management server for control of the system parameters to enable various modes of classification and device request rate limiting (J.) uses 1) a networked high-speed memory cache (104,204) and 2) a fingerprint publishing service (105,205).

L. Alternative Embodiments

Alternative embodiments of the systems and methods may be achieved in the following manners:
1. The front-end load-balancer and filtering device (102, 202) may be implemented by using any number of open-source and commercial products including but not limited to HAProxy, F5 Local Traffic Manager (LTM), Radware AppDirector, INGnx, CoyotePoint Equalizer, and Barracuda Load Balancer
2. The classification server(103) or service (203) may be executed on any number of HTTP servers, both open-source and commercial products, including but not limited to AOLserver, Apache HTTP Server, Apache Tomcat, Boa, Caucho Resin Server, Caudium, Cherokee HTTP Server, HFS, Hiawatha HTTP Server, IBM HTTP Server, Internet Information Services, Jetty, lighttpd, LiteSpeed Web Server, NaviServer, NCSA HTTPd, nginx, nodejs, OpenLink Virtuoso, Oracle HTTP Server, Oracle iPlanet Web Server, Oracle WebLogic Server, thttpd, TUX web server, Wakanda Server, Xitami, Yaws, and Zeus Web Server.
3. The classification server (103) or service (203) and the method for transferring data from the memory cached to a database (F.) may be implemented in various software languages including but not limited to: PHP, Java, Perl, C, C++, C#, J#, Python, TCL, Cold Fusion, Visual Basic, Lua, Ruby, and Visual Basic .NET.
4. The client puzzles used by the proof-of-work protocol (B.) may include but not be limited to "Guided Tour Puzzle", single level of difficulty hash pre-image puzzle, two-parameter hash pre-image puzzle, integer square root modulo a large prime, Weaken Fiat-Shamir signatures, Ong-Schnorr-Shamir signature, partial hash inversion, hash sequences, Diffie-Hellman-based puzzles, Mbound, Hokkaido, and Merkle tree based puzzles.
5. Database servers used for implementing the device fingerprint database (106,206) may include but not be limited to: 4D (4th Dimension), ADABAS, Adaptive Server Enterprise, Advantage Database Server (ADS), Altibase, Apache Derby, Clustrix, CUBRID, Datacom, DB2, Drizzle, Empress Embedded Database, EXASolution, Firebird, HSQLDB, H2, Informix Dynamic Server, Ingres, InterBase, Linter SQL RDBMS, LucidDB, MariaDB, MaxDB, Microsoft Access (JET), Microsoft Visual Foxpro, Microsoft SQL Server, Microsoft SQL Server Compact (Embedded Database), MonetDB/SQL, mSQL, MySQL, MemSQL, Nexusdb, HP NonStop SQL, Omnis Studio, OpenBase SQL, OpenEdge, OpenLink Virtuoso, Oracle RDB, Paradox, Pervasive PSQL, Polyhedra DBMS, PostgreSQL, R:Base, RDM, RDM Server, ScimoreDB, SmallSQL, SQL Anywhere, SQLBase, SQLite, Superbase, Teradata, UniData, and Xeround Cloud Database.
6. Device fingerprinting may implemented in a number of ways, including but not limited to: $41^{st}$ Parameter DeviceInsight and Time Differential Linking (TDL), Oracle Adpative Access Manager (OAAM) Flash and JavaScript client-side fingerprinters, and the methods described above in (B.).

M. Operation of an Exemplary Embodiment

The operation of an exemplary embodiment of the systems and methods will be described in the first case as the stand-alone deployment architecture (H.), and in the second case as a web services deployment model with subscribers (G.). This order of description will simplify the matter for the web services deployment since it may be viewed as a generalization of the stand-alone deployment model.

The stand-alone deployment is depicted in FIG. 2. Before beginning operations, the classification filter (203) is installed as an HTTP request preprocessor in the various content servers (208). Configuration parameters of the content servers ensure that the filter is applied to content types possibly delivered by the server (e.g. html, text, img, and on on). The load-balance and front-end filter (202) will initially have no device fingerprints established as filter criteria; these will arrive later after devices are classified. The memory cache (204) is started, and it begins with no data in it. Next the management server (207) writes the protocol parameters into the memory cache. These are the values for internet domain of applicability (e.g. .uspto.gov), the puzzle expiration time $T_e$, the server secret key $K_s$, a table of puzzle difficulties corresponding to values or ranges of attacker scores, the nominal attacker score, the white list and black list score threshold values, and the score increments and decrements for the puzzle state transitions shown in FIG. 7. As a general condition of distributed systems operations, all computers participating in the system should engage in a time-synchronization protocol such as, without limitation, Network Time Protocol (NTP) in order assure close agreement among their respective clocks. Finally, the database server and fingerprint publishers are started.

Now that the system is initialized, it is ready to classify requestor devices. Devices are initially NEW or unknown and therefore engaged in the proof-of-work protocol. Hostile devices will incur protocol violations that gradually increase their attacker score. As they continue to interact with classification filter, their attacker score will cross the black list threshold and they will be noted as such in the memory cache (204). In typical operations, only a few iterations of the proof-of-work protocol (e.g. 2-4) are necessary to reliably classify a device as hostile. Similarly, benign or non-hostile devices will after a few iterations of the protocol be classified as such and noted so in the memory cache. The design driver for the memory cache instead of direct writing to the database is the need for processing very high rates of request, since during a denial-of-service attack request rates may be several hundreds of thousands per second. The memory cache is orders of magnitude faster than the physical disk Input/Output (I/O) of a database server.

Periodically, the memory cache is copied to the database (206) by fingerprint publishing service (205). As white and black lists accumulate, they are transmitted to the load-balancer front-end filter (202) and placed as filter criteria on incoming requests. Requests originating from white-listed devise are allow to pass, and those from black-listed devices are refused or dropped.

In the possible case of hostile devices masquerading as non-hostile ones in order to gain white list status whereupon they launch a high request rate attack, such an event is readily detected by typical monitoring functions of distributed web systems. An alert is typically generated by the monitoring functions for handling by the operations staff. The operational response to this masquerade attack is to reset the server secret key, invalidate the white list in the database server (206), restart the memory cache (204) clearing all data from it, and remove the white list filter from the front-end filter (202). A final step in the operational response to this attack is to set new attacker score adjustment and puzzle difficulty parameters in place such that no white-listing occurs, so that all JavaScript-compliant devices will be required to incur delay through puzzle-solving work. If the hostile devices resort to protocol violating behavior because of the throttling effect of the proof-of-work puzzles, they will be blacklisted.

The operation of an embodiment in the second case as a web services deployment model with subscribers is similar to what just been described for the stand-alone case. In terms of system configuration, instead of a classification filter software element installed as request preprocessor, a dedicated set of classification servers comprising the classification service (103) embodies this function now. In addition, two load-balancer front-end filtering elements are deployed, one in front of the classification service (102) and another (108) in front the subscriber's web system. The operation of the management server (110), memory cache (104), fingerprint publisher (105), fingerprint database (106) are as described for the stand-alone case already. The system state is initialized in the same manner described above for the stand-alone case, with the addition that both front-end filter devices (102,108) have no filter criteria in place (in a multi-subscriber scenario, initialization of the filter criteria for 102 is constrained in scope each particular subscriber). A final configuration element is the establishment of a fully-qualified domain name (FQDN) for the classification service such its domain is the same as the subscriber's. For example, the classification might be designated "classifier.uspto.gov". The reason for this is that cookies involved in the proof-of-work protocol should be sent by standards-compliant devices to any server in the domain *.uspto.gov.

Now, the service is ready to classify requestors. Initially requests will be made of some web service in subscriber's domain (e.g. www.uspto.gov). The front-end filter (108) will determine whether a device is white-listed, black-listed, or unclassified. White-listed device's request will be passed through to their destination, black-listed device's request will be refused or dropped, and unclassified devices will be redirected to the classification service. In the case of device disrespecting the redirection, the front-end filter (108) will black-list them itself. This subscriber local blacklist will be periodically collected by fingerprint publishing service.

Devices following the redirect to the classification service will be engaged in the proof-of-work protocol and eventually be classified as hostile or benign/non-hostile. The device fingerprints for the white and black list are periodically sent to the subscriber front-end filter (108) for application as request filter criteria.

As a networking consideration, it is important that the network path for sending the filter criteria to the subscriber be independent of the external path to the front-end filter. During a denial-of-service attack the external link may become saturated or unusable, so a separate, private path for communicating between the classification service and the subscriber front-end filter is possibly, without limitation, as a private network link, packet radio link, or some other assured secondary channel.

In the multi-subscriber situation, which is an exemplary operational embodiment, all subscribers will share in the white and black lists of device fingerprints though periodic or on-demand distributions of that information.

In the case of the masquerade attack described for the stand-alone deployment case, the same operational responses will be made by the system operator of the classification service. These actions must be coordinated between the subscriber and classification service operator.

What has been described and illustrated herein is exemplary embodiments of the systems and methods along with some of its variations. The terms, descriptions and figures used herein are set forth by way of illustration only and are not meant as limitations. Those skilled in the art will recognize that many variations are possible within the spirit and scope of this disclosure in which all terms are meant in their broadest, reasonable sense unless otherwise indicated. Any headings utilized within the description are for convenience only and have no legal or limiting effect.

What is claimed is:

1. A method for classifying a network device, comprising:
receiving a request for access from the network device;
assigning a classification score to the network device;
supplying a device fingerprinting script to the network device, wherein the device fingerprinting script, when executed, causes the network device to calculate and return a device fingerprint of the network device;
receiving the device fingerprint of the network device;
associating the classification score with the device fingerprint of the network device;
placing the device fingerprint of the network device on a list of device fingerprints which have not been classified as either hostile, in which case the device fingerprint is on a blacklist of denied device fingerprints, or benign, in which case the device fingerprint is on a whitelist of approved device fingerprints;
supplying a first puzzle including the device fingerprinting script and a puzzle solving script to the network device, wherein the puzzle solving script, when executed, causes the network device to generate a device challenge that is based at least in part on the first puzzle and a device nonce, the first puzzle having a difficulty that is based at least in part on the classification score associated with the device fingerprint of the network device;
receiving a solution to the first puzzle from the network device, the solution including parameters representing the device challenge, a solution to the device challenge, and the device fingerprint of the network device;
performing one or more tamper checks on the solution to the first puzzle in response to determining that the solution to the first puzzle is not expired within a selected period of time;

updating a usage count of the first puzzle, wherein the usage count represents a number of occurrences of the first puzzle;

comparing the updated usage count with a threshold usage count;

in response to detecting that the updated usage count exceeds the threshold usage count, comparing device fingerprints associated with each occurrence of the first puzzle, and classifying two or more different device fingerprints as hostile when the two or more different device fingerprints are associated with the first puzzle;

changing the classification score associated with the device fingerprint of the network device based at least in part on the solution to the first puzzle received from the network device;

comparing the classification score associated with the device fingerprint of the network device to a classification score threshold; and classifying the device fingerprint of the network device if the classification score meets the classification score threshold.

2. The method of claim 1, wherein the request is an HTTP request.

3. The method of claim 1, further comprising:

storing the first puzzle, the device fingerprint of the network device, and the classification score associated with the device fingerprint of the network device; and associating the first puzzle, the device fingerprint of the network device, and the classification score associated with the device fingerprint of the network device.

4. The method of claim 1, wherein at least one of the device fingerprinting script and the puzzle solving script comprises a program written in a scripting language.

5. The method of claim 1, further comprising comparing the solution parameters to a proper set of parameters.

6. The method of claim 5, wherein changing the classification score associated with the device fingerprint of the network device is based at least in part on comparing the solution parameters to the proper set of parameters.

7. The method of claim 5, further comprising determining if the solution is expired.

8. The method of claim 7, wherein determining if the solution is expired comprises comparing a time value parameter to a clock value.

9. The method of claim 7, wherein changing the classification score associated with the device fingerprint of the network device is based at least in part on determining if the solution is expired.

10. The method of claim 1, wherein performing the one or more tamper checks comprises:

comparing the device challenge from the solution to a server-calculated device challenge based on the first puzzle and the device nonce;

receiving elements of the first puzzle from the network device, computing a tamper check puzzle based on the elements of the first puzzle, and comparing the tamper check puzzle to the first puzzle; and computing a tamper check device challenge based on the elements of the first puzzle and the device nonce, and comparing the tamper check device challenge to the device challenge from the solution.

11. The method of claim 1, wherein changing the classification score associated with the device fingerprint of the network device is based at least in part on performing the one or more tamper checks.

12. The method of claim 7, further comprising verifying the solution.

13. The method of claim 12, wherein changing the classification score associated with the device fingerprint of the network device is based at least in part on verifying the solution.

14. The method of claim 1, further comprising determining whether the solution to the first puzzle is received from the network device.

15. The method of claim 14, further comprising classifying the network device as hostile if no solution to the first puzzle is received from the network device.

16. The method of claim 1, further comprising limiting a request rate of the network device based on the classification score associated with the device fingerprint of the network device.

17. The method of claim 1, further comprising incrementing a request counter for the device fingerprint.

18. The method of claim 17, further comprising comparing the request counter to a request threshold.

19. The method of claim 18, further comprising classifying the network device as hostile if the request counter meets the request threshold.

20. The method of claim 18, further comprising issuing a redirect instruction to the network device if the request counter does not meet the request threshold.

21. A system for classifying a network device, comprising:

a server comprising a memory and a server filter, the server configured to:

receive a request for access from the network device;

assign a classification score to the network device;

supply a device fingerprinting script to the network device, wherein the device fingerprinting script, when executed, causes the network device to calculate and return a device fingerprint of the network device;

receive the device fingerprint of the network device;

associate the classification score with the device fingerprint of the network device;

place the device fingerprint of the network device on a list of device fingerprints which have not been classified as either hostile, in which case the device fingerprint is on a blacklist of denied device fingerprints, or benign, in which case the device fingerprint is on a whitelist of approved device fingerprints;

generate a first puzzle including the device fingerprinting script and a puzzle solving script for the network device, wherein the puzzle solving script, when executed, causes the network device to generate a device challenge that is based at least in part on the first puzzle and a device nonce, the first puzzle having a difficulty based at least in part on the classification score associated with the device fingerprint of the network device;

communicate the first puzzle to the network device;

receive a solution to the first puzzle from the network device, the solution including parameters representing the device challenge, a solution to the device challenge, and the device fingerprint of the network device;

perform one or more tamper checks on the solution to the first puzzle in response to determining that the solution to the first puzzle is not expired within a selected period of time;

update a usage count of the first puzzle, wherein the usage count represents the number of occurrences of the first puzzle;

compare the updated usage count with a threshold usage count;

in response to detecting that the updated usage count exceeds the threshold usage count, compare device fingerprints associated with each occurrence of the first puzzle, and classify two or more different device fingerprints as hostile when the two or more different device fingerprints are associated with the first puzzle;

change the classification score associated with the device fingerprint of the network device based at least in part on the solution to the first puzzle received from the network device;

compare the classification score associated with the device fingerprint of the network device to a classification score threshold; and classify the network device if the classification score meets the classification score threshold.

22. A system for classifying a network device, comprising:

at least one load balancer, comprising a hardware processor, communicatively connected to the network device and configured to receive a request for access from the network device;

a server communicatively connected to the at least one load balancer and configured to:

assign a classification score to the network device;

supply a device fingerprinting script to the network device, wherein the device fingerprinting script, when executed, causes the network device to calculate and return a device fingerprint of the network device;

receive the device fingerprint of the network device;

associate the classification score with the device fingerprint of the network device;

place the device fingerprint of the network device on a list of device fingerprints which have not been classified as either hostile, in which case the device fingerprint is on a blacklist of denied device fingerprints, or benign, in which case the device fingerprint is on a whitelist of approved device fingerprints;

generate a first puzzle including the device fingerprinting script and a puzzle solving script for the network device, wherein the puzzle solving script, when executed, causes the network device to generate a device challenge that is based at least in part on the first puzzle and a device nonce, the first puzzle having a difficulty based at least in part on the classification score associated with the device fingerprint of the network device;

communicate the first puzzle to the network device;

receive a solution to the first puzzle from the network device, the solution including parameters representing the device challenge, a solution to the device challenge, and the device fingerprint of the network device;

perform one or more tamper checks on the solution to the first puzzle in response to determining that the solution to the first puzzle is not expired within a selected period of time;

update a usage count of the first puzzle, wherein the usage count represents the number of occurrences of the first puzzle;

compare the updated usage count with a threshold usage count;

in response to detecting that the updated usage count exceeds the threshold usage count, compare device fingerprints associated with each occurrence of the first puzzle, and classify two or more different device fingerprints as hostile when the two or more different device fingerprints are associated with the first puzzle; and change the classification score associated with the device fingerprint of the network device based at least in part on the solution to the first puzzle received from the network device;

compare the classification score associated with the device fingerprint of the network device to a classification score threshold; and classify the network device if the classification score meets the classification score threshold.

23. The system of claim 22, wherein the at least one load balancer is further configured to receive the device fingerprint of the network device.

24. The system of claim 23, further comprising a memory device communicatively connected to the server and the at least one load balancer, the memory device configured to store the device fingerprint of the network device, the classification score associated with the device fingerprint of the network device, and the first puzzle communicated to the network device.

25. The system of claim 24, wherein the server is configured to update a puzzle state of the first puzzle stored in the memory device.

26. The system of claim 24, wherein the server is configured to update a usage count of the first puzzle stored in the memory device.

27. The system of claim 22, wherein the server is configured to update the classification score associated with the device fingerprint of the network device stored in the memory device.

28. The system of claim 27, wherein the server is configured to update a device state of the network device.

29. The system of claim 28, wherein the memory device comprises the blacklist of hostile network devices, and the server is configured to store the device fingerprint in the blacklist.

30. The system of claim 29, wherein the at least one load balancer is further configured to increment a request counter for each occurrence of the device fingerprint of the network device, and compare the request counter to a request threshold.

31. The system of claim 30, wherein the at least one load balancer is further configured to communicate a redirect instruction to the network device.

32. The system of claim 30, wherein the at least one load balancer is further configured to store the device fingerprint in the blacklist.

33. The system of claim 32, further comprising a fingerprint publisher configured to communicate the blacklist to at least one service subscriber.

34. The system of claim 22, wherein the at least one load balancer comprises a server request filter.

35. The system of claim 22, further comprising a management server configured to provide at least one parameter for the server to apply to at least one server function.

36. A non-transitory computer-readable medium, comprising:

instructions that, when executed by a processor, cause the processor to perform a method for classifying a network device comprising:

receiving a request for access from the network device;

assigning a classification score to the network device;

supplying a device fingerprinting script to the network device, wherein the device fingerprinting script, when executed, causes the network device to calculate and return a device fingerprint of the network device;

receiving the device fingerprint of the network device;

associating the classification score with the device fingerprint of the network device;

placing the device fingerprint of the network device on a list of device fingerprints which have not been classified as either hostile, in which case the device fingerprint is on a blacklist of denied device fingerprints, or benign, in which case the device fingerprint is on a whitelist of approved device fingerprints;

supplying a first puzzle including the device fingerprinting script and a puzzle solving script to the network device, wherein the puzzle solving script, when executed, causes the network device to generate a device challenge that is based at least in part on the first puzzle and a device nonce, the first puzzle having a difficulty that is based at least in part on the classification score associated with the device fingerprint of the network device;

receiving a solution to the first puzzle from the network device, the solution including parameters representing the device challenge, a solution to the device challenge, and the device fingerprint of the network device;

performing one or more tamper checks on the solution to the first puzzle in response to determining that the solution to the first puzzle is not expired within a selected period of time;

updating a usage count of the first puzzle, wherein the usage count represents the number of occurrences of the first puzzle;

comparing the updated usage count with a threshold usage count;

in response to detecting that the updated usage count exceeds the threshold usage count, comparing device fingerprints associated with each occurrence of the first puzzle, and classifying two or more different device fingerprints as hostile when the two or more different device fingerprints are associated with the first puzzle;

changing the classification score associated with the device fingerprint of the network device based at least in part on the solution to the first puzzle received from the network device;

comparing the classification score associated with the device fingerprint of the network device to a classification score threshold; and classifying the device fingerprint of the network device if the classification score meets the classification score threshold.

37. The non-transitory computer-readable medium of claim 36, wherein the request is an HTTP request.

38. The non-transitory computer-readable medium of claim 36, the method further comprising:

storing the first puzzle, the device fingerprint of the network device, and the classification score associated with the device fingerprint of the network device; and associating the first puzzle, the device fingerprint of the network device, and the classification score associated with the device fingerprint of the network device.

39. The non-transitory computer-readable medium of claim 36, wherein at least one of the device fingerprinting script and the puzzle solving script comprises a program written in a scripting language.

40. The non-transitory computer-readable medium of claim 36, the method further comprising comparing the parameters from the solution to a proper set of parameters.

41. The non-transitory computer-readable medium of claim 40, wherein changing the classification score associated with the device fingerprint of the network device is based at least in part on comparing the solution parameters to the proper set of parameters.

42. The non-transitory computer-readable medium of claim 40, the method further comprising determining if the solution is expired.

43. The non-transitory computer-readable medium of claim 42, wherein determining if the solution is expired comprises comparing a time value parameter to a clock value.

44. The non-transitory computer-readable medium of claim 42, wherein changing the classification score associated with the device fingerprint of the network device is based at least in part on determining if the solution is expired.

45. The non-transitory computer-readable medium of claim 36, wherein performing the one or more tamper checks comprises:

comparing the device challenge from the solution to a server-calculated device challenge based on the first puzzle and the device nonce;

receiving elements of the first puzzle from the network device, computing a tamper check puzzle based on the elements of the first puzzle, and comparing the tamper check puzzle to the first puzzle; and computing a tamper check device challenge based on the elements of the first puzzle and the device nonce, and comparing the tamper check device challenge to the device challenge from the solution.

46. The non-transitory computer-readable medium of claim 36, wherein changing the classification score associated with the device fingerprint of the network device is based at least in part on performing the one or more tamper checks.

47. The non-transitory computer-readable medium of claim 42, the method further comprising verifying the solution.

48. The non-transitory computer-readable medium of claim 47, wherein changing the classification score associated with the device fingerprint of the network device is based at least in part on verifying the solution.

49. The non-transitory computer-readable medium of claim 36, the method further comprising determining whether the solution to the first puzzle is received from the network device.

50. The non-transitory computer-readable medium of claim 49, further comprising classifying the network device as hostile if no solution to the first puzzle is received from the network device.

51. The non-transitory computer-readable medium of claim 36, the method further comprising limiting a request rate of the network device based on the classification score associated with the device fingerprint of the network device.

52. The non-transitory computer-readable medium of claim 36, the method further comprising incrementing a request counter for the device fingerprint.

53. The non-transitory computer-readable medium of claim 52, the method further comprising comparing the request counter to a request threshold.

54. The non-transitory computer-readable medium of claim 53, the method further comprising classifying the network device as hostile if the request counter meets the request threshold.

55. The non-transitory computer-readable medium of claim 53, the method further comprising issuing a redirect instruction to the network device if the request counter does not meet the request threshold.

56. The method of claim 1, further comprising classifying the network device as hostile, or supplying a second puzzle to the network device, based at least in part on the classification score associated with the device fingerprint of the network device.

57. The method of claim 1, further comprising classifying the network device as benign, or supplying a second puzzle to the network device, based at least in part on the classification score associated with the device fingerprint of the network device.

58. The method of claim 1, further comprising classifying the network device as hostile or benign, based at least in part on the classification score associated with the device fingerprint of the network device.

59. The non-transitory computer-readable medium of claim 36, the method further comprising classifying the network device as hostile, or supplying a second puzzle to the network device, based at least in part on the classification score associated with the device fingerprint of the network device.

60. The non-transitory computer-readable medium of claim 36, the method further comprising classifying the network device as benign, or supplying a second puzzle to the network device, based at least in part on the classification score associated with the device fingerprint of the network device.

61. The non-transitory computer-readable medium of claim 36, the method further comprising classifying the network device as hostile or benign, based at least in part on the classification score associated with the device fingerprint of the network device.

\* \* \* \* \*